United States Patent [19]
Schutzer et al.

[11] Patent Number: 5,920,848
[45] Date of Patent: Jul. 6, 1999

[54] METHOD AND SYSTEM FOR USING INTELLIGENT AGENTS FOR FINANCIAL TRANSACTIONS, SERVICES, ACCOUNTING, AND ADVICE

[75] Inventors: Daniel Schutzer, Scarsdale, N.Y.; William Hull Forster, Jr., The Hague, Netherlands; Huanrui Hu; Wenke Lee, both of New York, N.Y.; Salvatore J. Stolfo, Ridgewood, N.J.; Wei Fan, New York, N.Y.

[73] Assignee: Citibank, N.A., New York, N.Y.

[21] Appl. No.: 09/010,677

[22] Filed: Jan. 22, 1998

Related U.S. Application Data

[60] Provisional application No. 60/037,069, Feb. 12, 1997.
[51] Int. Cl.$^6$ .................................................... G06F 17/60
[52] U.S. Cl. .................................................. 705/42; 705/33
[58] Field of Search .................................. 705/26, 30, 31, 705/33, 34, 35, 39, 40, 42, 43, 44; 235/379, 380, 381

[56] References Cited

U.S. PATENT DOCUMENTS

| | | |
|---|---|---|
| 5,546,452 | 8/1996 | Andrews et al. . |
| 5,557,518 | 9/1996 | Rosen . |
| 5,590,197 | 12/1996 | Chen et al. ................................. 380/24 |
| 5,649,115 | 7/1997 | Schrader et al. ........................... 705/33 |
| 5,710,887 | 1/1998 | Chelliah et al. ........................... 705/26 |
| 5,727,950 | 3/1998 | Cook et al. ................................ 434/350 |

OTHER PUBLICATIONS

"Reality Debuts Reuters Money Network for Quicken Users, the Online Personal Investing Service that Gives Quicken Users Access to Wall Street"; *PR Newswire*; Dateline: King of Prussia, PA; Mar. 22, 1994; Dialog: file 621, Acc# 00472770.

Foremski; "Welcome to the Machine"; *Electronics Weekly*; n 1707; p. 20(1); Jan. 1995; Dialog: File 148, Acc# 07669870.

International Search Report dated Sep. 1, 1998.

L.F. Motiwalla, An Intelligent Agent for Prioritizing E–Mail Messages, Info Resour. Manage. J., vol. 8, No. 2, pp. 16–24, (Spring 1995).

*Primary Examiner*—Stephen R. Tkacs
*Attorney, Agent, or Firm*—George T. Marcou; Kilpatrick Stockton LLP

[57] ABSTRACT

The present invention relates to the use of computerized intelligent agents to facilitate the integration of networked performance of financial transactions with computerized methods of financial accounting. Incorporated into this combined financial transaction/financial accounting system are intelligent agents that automatically analyze the system information to provide users with financial advice. This invention permits the automated performance on-line of a wide variety of financial transactions and integrates these transactions with computerized financial accounting. All of this information is collated and analyzed automatically by intelligent agents, which generate user-specific financial reports, profiles, and advice, and under appropriate conditions take action.

73 Claims, 26 Drawing Sheets

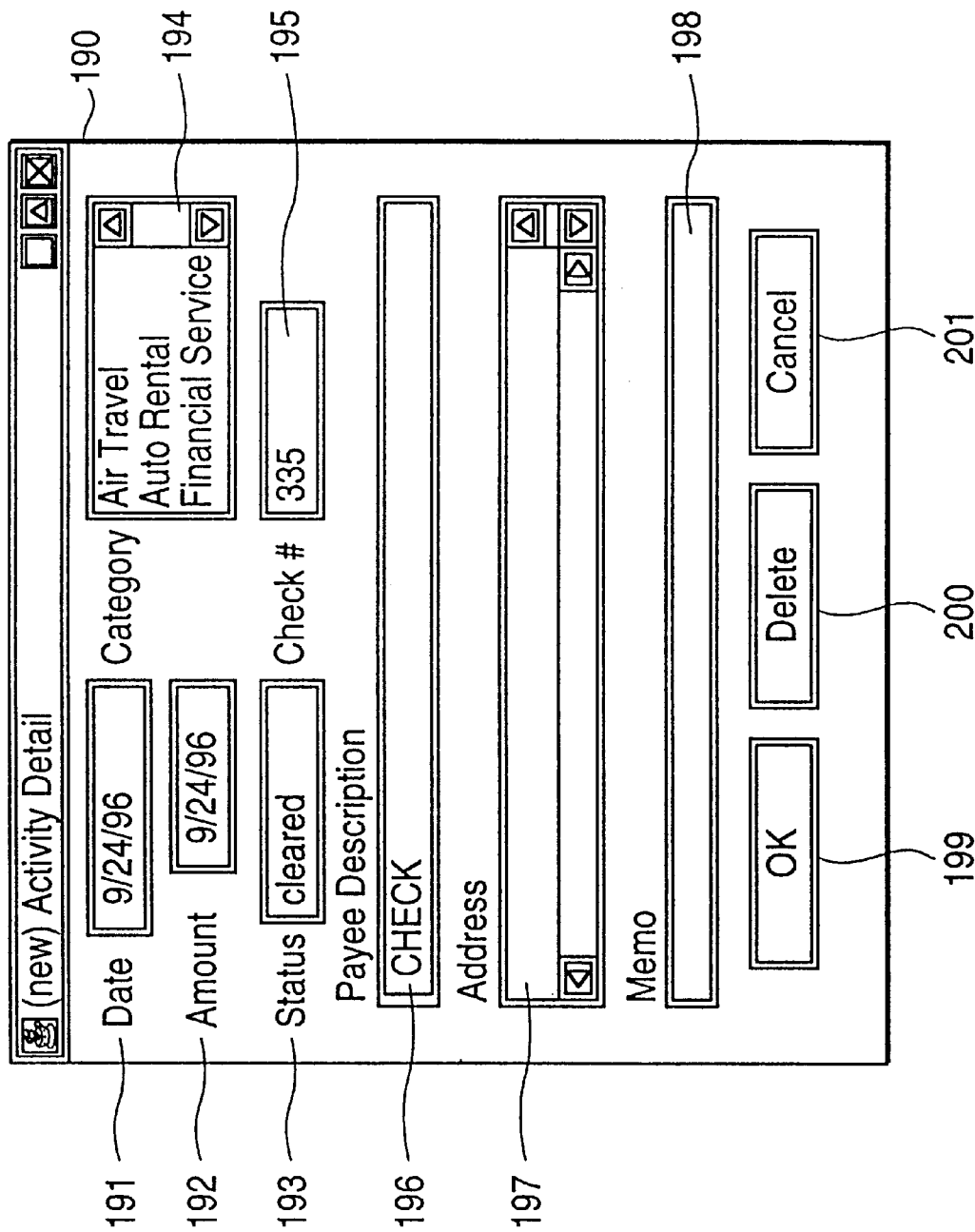

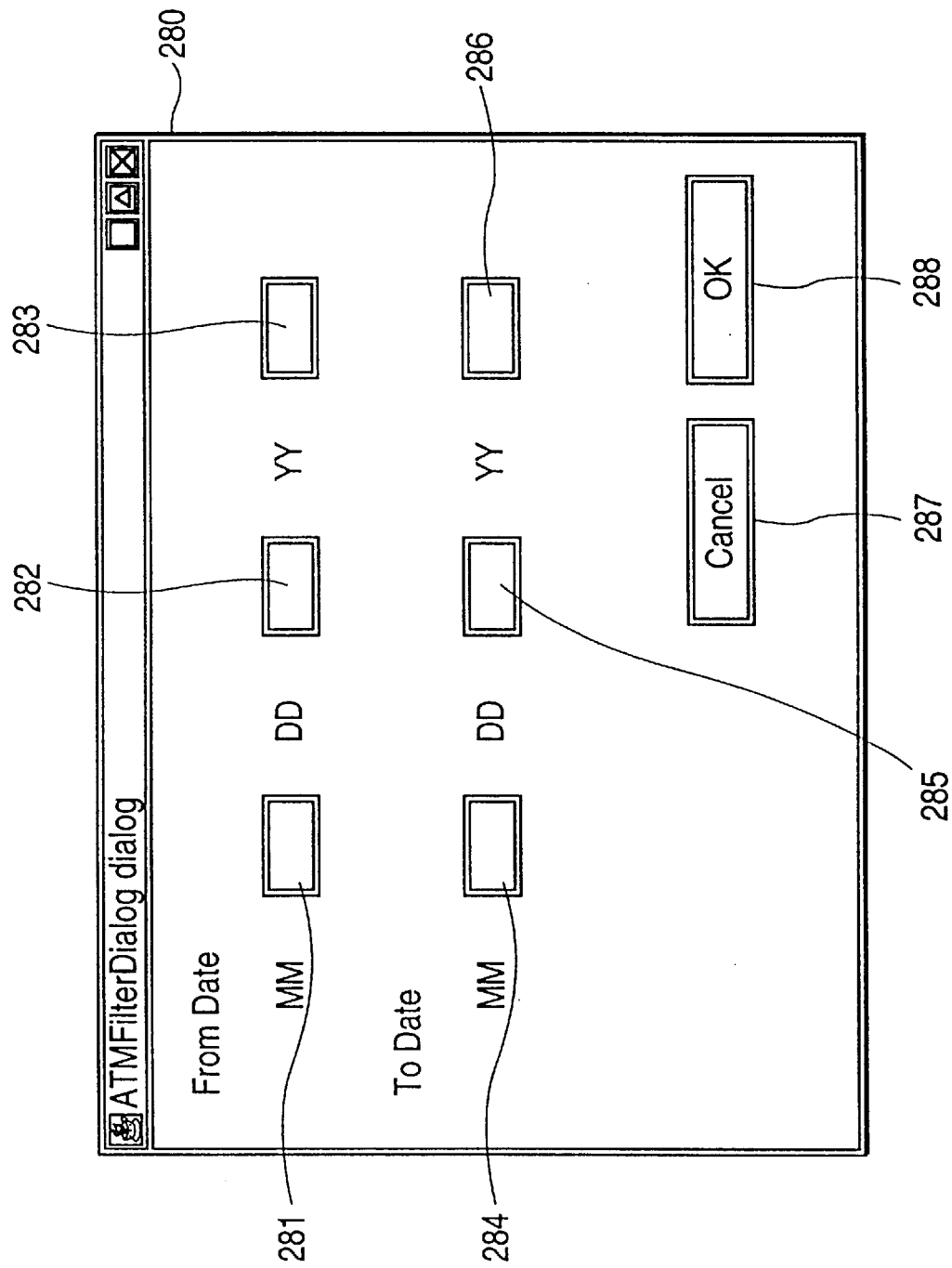

METHOD AND SYSTEM FOR USING INTELLIGENT AGENTS FOR FINANCIAL TRANSACTIONS, SERVICES, ACCOUNTING, AND ADVICE

This application claims benefit of provisional application Ser. No. 60/037,069 filed Feb. 12, 1997.

FIELD OF THE INVENTION

The present invention generally relates to the field of computerized intelligent agents, and more particularly to the integration of on-line performance of financial transactions across multiple accounts with computerized methods of financial functions, in a system and method for intelligent agents to collate and analyze information to generate user-specific reports, profiles, and advice and to take appropriate action.

BACKGROUND OF THE INVENTION

Increasingly the public is going on-line for a variety of transactions and information. More than 30% of the population have personal computers and modems. Furthermore, over 60% of people with bank accounts have personal computers and modems. At the same time the number of people subscribing and using on-line services is greater than 40 million, and this number is growing at an exponential rate.

As the public uses computers with a greater frequency, more financial transactions are being automated and performed via computer. There is good motivation to bank on-line. On-line banking provides convenience, safety, cost savings, and potentially new types of services not readily or conveniently available via in-person banking. Such potentially new services include access to superior up-to-the minute information, on-line investment clubs, information filters, and search agents.

With the increase in the number of financial transactions performed on-line, the convenience and cost-savings of banking on-line also increases. Additionally new and more powerful methods are being developed for protecting the security of financial transactions performed on-line. The result is that convenience, cost savings and enhanced security have combined to make on-line financial services more useful and effective, thereby driving the development of newer and more integrated services. More sophisticated financial systems that offer greater integration and a high degree of user control enable on-line users to synthesize, monitor, and analyze a wide array of financial transactions and personal financial data.

Currently, methods exist for users to perform a variety of on-line financial transactions, but these methods do not offer integrated personal financial accounting. For example, users may bank on-line, thereby enabling performance of transactions, such as transfers from one account to another. Additionally users may perform transactions on-line, such as stock or mutual fund purchases. In these approaches, users are able to perform certain basic financial transactions.

Additionally, methods exist for users to perform computerized personal financial accounting via a variety of personal financial software applications. These methods do not offer the user the ability to integrate on-line performance of financial transactions. For example, these software applications help users to categorize and keep track of financial expenses, tax information, or financial transactions. Generally these software applications require that users enter this financial information after such information has been recorded and collected by the user in a checkbook, accounting book, or another software application or to receive downloads. This includes downloads from different institutions with differing conventions, categories and level of detail.

Therefore, there is no existing system that effectively integrates performance of financial transactions with financial accounting. As a result, the automated performance of financial transactions is separate and distinct from any computerized method of accounting. Thus, a user can bank on-line, but cannot easily take that transaction information and readily transfer it into a computer application for financial accounting. This makes it more difficult for users to reconcile bank statements efficiently or to quickly obtain a complete picture of their personal finances, such as monthly expenses and average monthly bank account balances.

Further, existing art methods for financial transaction performance on-line do not combine the features of tracing and monitoring transactions with an integrated financial accounting software application. Without this integration, the user cannot readily and seamlessly combine on-line banking with personal financial accounting.

Without an easy and quick way to collate financial information, consumers must rely completely on others for financial advice, or they must accept the inability to easily obtain a thorough understanding of their own financial situation. These difficulties make consumer choices about their financial future more inefficient and less informed. Therefore, a need exists for users to have a quick and efficient way to integrate all of their financial information and for such information to be distilled and analyzed efficiently and thoroughly.

A useful method of assisting the integration and analysis of information, such as financial information, is by incorporating intelligent agents into an information system. An intelligent agent is a computer program that can perform a variety of tasks for a computer user. Typically a computer user will instruct an intelligent agent to assist the user by automatically performing a function and reporting the results of that performed function and/or take an action. Intelligent agents have been used for such things as negotiating transactions on behalf of users, reducing information overload for computer users, and handling and prioritizing electronic mail on behalf of users. In each case, intelligent agents have been employed to automatically perform tasks for users that would otherwise require the users' constant and immediate attention. The result is that intelligent agents enable users to utilize time more efficiently and to obtain results and analysis quickly and without the users' constant attention to the task being performed by the intelligent agent.

One current approach of utilizing intelligent agents in an information system is to place agents in the role of finalizing, verifying, or closing a transaction. This approach employs agents within the stream of electronic commerce.

Another approach of using intelligent agents in an information system is to incorporate agents in a telephone or communications network. This method of using agents focuses on the agents that can route telephone calls or send messages through a communication system.

An example of the existing technology is Rosen, *Trusted Agents for Open Electronic Commerce*, U.S. Pat. No. 5,557, 518. This system utilizes agents to participate in an electronic dialogue and agree on terms of payment for a product or a service or to verify a form of identification. In this system, agents are embedded in a transaction device that reviews electronic information presented by a customer for the purpose of accepting a payment or for verifying electronic identification presented by a user.

Another example of existing art is Motiwalla, *An Intelligent Agent for Prioritizing E-Mail Messages* (IN Inf. Resour. Manage. J., Vol. 8, no. 2, pp. 16–24, Spring 1995). This system uses an intelligent agent to follow a user's preferences and organizational considerations in presenting and prioritizing electronic mail to users.

An example of existing patented art is Andrews, et al., *Communications System Using A Central Controller to Control At Least One Network and Agent System*, U.S. Pat. No. 5,546,452. In this system, intelligent agents are used to interface with a network and deliver status messages to permit transmission and routing of communications signals.

None of the prior art methods utilize intelligent agents within an information system for the purpose of integrating and analyzing details of financial transactions and financial accounting across institutions, and taking appropriate actions, where the agent relieves the user of much of the routing details and learns and adapts.

SUMMARY OF THE INVENTION

It is an object of the present invention to provide an integrated financial transaction and financial accounting system with incorporated intelligent agents to meet the important financial needs of synthesizing, parsing, and analyzing a user's complete financial picture. It is a further object of the present invention to take a new approach to automated finances by combining automated performance on-line for a wide variety of financial transactions with automated monitoring and tracing of financial transactions, as well as automated classification and tracking of financial expenses and under certain prespecified conditions taking action.

It is a further object of the present invention to provide the user with interfaces to a variety of new intelligent agents and machine learning technologies to monitor information, collect information, and generate user-specific advice or reports.

It is a further object of the present invention to utilize machine learning technologies to enable intelligent agents to analyze collated information and to generate proactive reports or alarms.

It is a further object of the present invention to use intelligent agents and machine learning technologies to combine information from financial transactions, financial expense categorization, and financial accounting across different accounts to generate financial reports and summaries and to create user-specific financial profiles.

It is a further object of the present invention to enable a user to perform, collect, and maintain financial transactions across a network, such as the internet, and across other on-line services and for multiple financial institutions. It is a further object of the present invention to give a user the capability to monitor, maintain, and pay bills across an information system and across a network. It is a further object of the present invention to include a method for agents to learn, and for users to maintain and modify rule-based payment instructions.

It is a further object of the present invention to provide a system that acts as a reservoir or deposit for all financial information.

It is a further object of the present invention to act as a financial warning mechanism, which includes a number of proactive financial alarms and alerts.

The present invention comprises a system which includes: (1) integration of automated financial transaction performance and automated financial accounting or automated financial functions; (2) accessibility of rapidly generated personal financial reports based upon up-to-the minute financial informal ion; (3) timely advice provided by a financial system integrating financial transaction and personal financial accounting functions; and (4) proactive financial alarms and alerts provided by a financial system integrating up-to-the minute financial transaction and personal financial accounting information.

An important aspect of the system allows a computer user to perform a wide variety of financial transactions on a network, such as the internet, and to monitor and trace these financial transactions. This system also enables a user to classify financial transactions and to categorize and track financial expenses. New intelligent agents and machine learning technologies provide the present invention with the capacity to combine information from financial transact ions and financial expense categorization and accounting so that financial reports and summaries are generated, user-specific financial profiles are created, and user-specific proactive financial alerts and alarms are displayed. Additionally, users are able to generate and direct execution of a series of bill payment or financial investment instructions via this new system.

This information system provides users with the capability to perform a wide variety of financial transactions on-line, including bill payment and stock purchases. Moreover, users combine this on-line performance of financial transactions with the tracing and monitoring of these financial transactions. Users also integrate their personal financial accounting with the financial transaction performance, monitoring, and tracing information provided by the system. Incorporated in the present invention are user interfaces with a plurality of intelligent agents, which are software applications that monitor, collect data, and generate user-specific advice, reports, or alerts. The present invention also provides that intelligent agents trace and monitor financial transactions and financial expenses.

To achieve the stated and other objects of the present invention, as embodied and described below, the present invention includes the steps of initiating a local client application on a terminal, establishing communication with a server, selecting a financial transaction, inputting information relating to the selected financial transactions, the server automatically performing the financial transaction, and automatically downloading information related to the performance of financial transactions from the server to the local client application. In addition, the invention includes the steps of transferring downloaded information related to performed financial transactions from a local client application to a financial software application, performing financial functions using downloaded information related to performed financial transactions to produce output information, transmitting the output information from a financial software application to a local client application, and uploading the output information from a local software application to a server.

To achieve the stated and other objects of the present invention embodied and described below, the invention further includes intelligent agents automatically monitoring, automatically tracing, and automatically recording information related to financial transactions, automatically collating information downloaded from a server, automatically transferring downloaded information to a financial software application, automatically transferring downloaded information to a data file and to a model file, automatically analyzing downloaded information, automatically monitoring, classifying and tracking uploaded information related to financial functions, automatically collating information related to financial functions, automatically transferring uploaded information to a server, and automatically analyzing uploaded information related to financial functions. Additionally, the invention includes the step of intelligent agents combining uploaded information related to financial transactions and downloaded information related to financial functions to create a complete financial information profile of a user, the step of intelligent agents using downloaded information related to performance of financial transactions to generate user-specific profiles, reports, alerts, alarms, and reminders, and the step of intelligent agents using uploaded information related to financial functions to generate user-specific profiles, reports, alerts, alarms, and reminders.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIG. 13A shows the activity details pop-up window.

FIG. 22A is the ATM filter dialog window.

DETAILED DESCRIPTION

Figure 1:
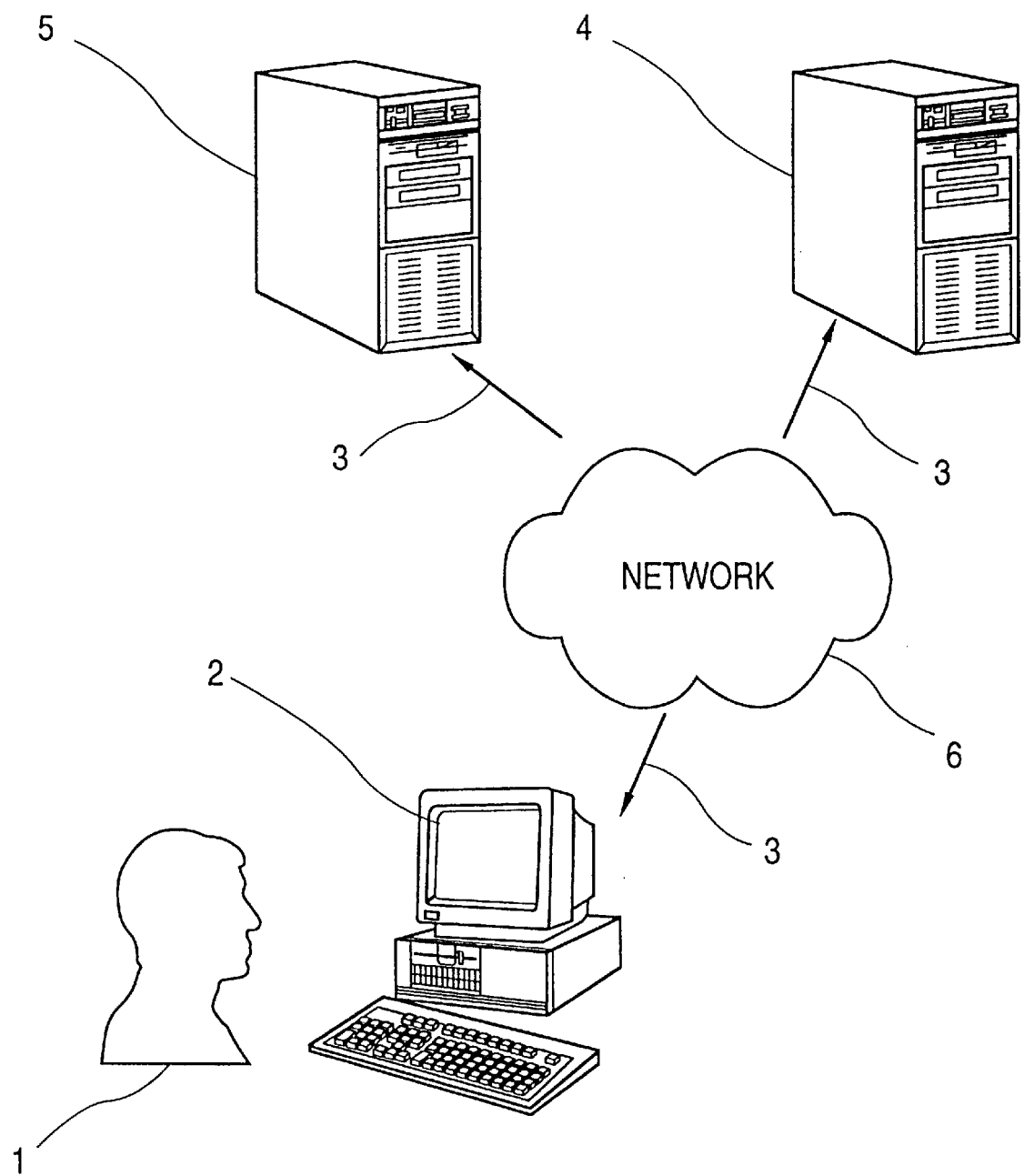
FIG. 1 shows an overview of the key components of the system.

The present invention relates to automated and agent-assisted network performance of a wide variety of financial transactions. In an embodiment of the present invention, users access on a network a variety of financial transactions and perform functions for monitoring and tracing of financial transactions and integrated personal financial accounting using intelligent agents. In an embodiment of the present invention, the system includes a plurality of intelligent agents that perform these and other functions.

In an embodiment of the present invention, the user utilizes a local software application and connection to a networked server, such as a bank server, to perform on-line functions. In an embodiment of the present invention, the system is windows-based and menu-driven, which is described more fully in the examples and flow charts below.

In an embodiment of the present invention, the system utilizes local software to integrate the various components and interactions of the system. Additionally a module is utilized to download information by socket. Another module is utilized to handle the conversion between the downloaded file and local file. Additional modules are employed to handle the merging file by object linking and embedding (OLE) protocol. Yet another module is used to search the model file and the data file to provide the user with warnings and reminders. An additional module is required to handle on-line transactions via OLE calling of the local software application.

In an embodiment of the present invention, several files are maintained in the local machine, including: 1) a data file to keep all the downloaded information and all the on-line transactions made by the user; and 2) a model file to maintain paying habits rules and reminder input.

Furthermore, in an embodiment of the present invention, the system records all data concerning financial transactions on user accounts across different financial institutions. The system also allows the user to perform trace operations on a particular transaction. Additionally, in an embodiment of the present invention, the system classifies all financial transactions according to a set of user-defined expense categories. The system provides a default or standard set of expense categories, which the user may modify. It also can learn an optimum expense categorization customized to the user and his/her goals. A further aspect of the invention provides that the system generates financial reports and summaries to the user based upon expense categories. Moreover, the system provides a means for the user to perform on-line transactions on his/her accounts across financial institutions.

A further aspect of an embodiment of the present invention is that the system provides users with intelligent assistance/advice on financial management. The types of intelligent assistance include: 1) warning on monthly pending payment; 2) warning on low balance; 3) advice in paying a bill a few days later based upon withdrawal habit of the payee; 4) advice on moving money to a higher yielding account; 5) automatically invoking (by import) other financial planning software on the user's personal computer; and 6) warning that a spending threshold has been crossed. The system also provides a user financial profile to the intelligent agent server. This profile indicates a variety of user characteristics, such as user income, spending habit, and tolerance.

Additional aspects of the present invention are the interface requirements. The system interfaces with the on-line servers of a large number of financial institutions though data file downloading/uploading across the internet so that transaction data is loaded into the system and the user profile, is uploaded to an intelligent agent server. The system interfaces with other personal financial software though data file sharing/import/export so that the system and local personal financial software applications accommodate each other in terms of functionality. Furthermore, the system provides a graphical user interface (GUI), and it is able to run within internet navigators.

The present invention includes a variety of performance and usability requirements. The download/upload of data files across the internet is not slower than similar tasks performed by common internet navigators. Any operation that requires more than five seconds automatically pops up a dialog box with a message indicating the task being performed. Additionally the system provides a means for end-users to set expense categories, alarms, and reminders, and to configure other system features. Furthermore the system provides a help command on each of its sub-systems detailing the task background and operation steps. The system also learns from observing user actions and makes suggestions, such as budgeting and timing advice.

In an embodiment of the present invention, distribution and maintenance requirements enable the end-user to download via the internet the system from the intelligent agent server site to their home computers. As new features are added to the system, end-users download the patches from the intelligent agent server site. The patches are integrated into the existing system seamlessly, without users going through compiling, linking, and reinstalling.

In general, operation of an embodiment of the present invention is as follows. When the user inputs a correct access number and personal identification number (PIN), the system prompts the user via a menu for the account the user wishes to down-load. An aspect of the present invention is that the system prevents an unauthorized user from using any operation of the system and from viewing any of the system or transaction data files.

Upon down-loading the desired account, the user receives updated financial information automatically at the user's local terminal, such as a personal computer (PC). In an embodiment of the present invention, the application that implements this function uses a JAVA applet and a socket structure. The process of file transfer is transparent to the user. Updated financial information that may be downloaded by the user after accessing the server includes recently cleared checks, deposits, ATM withdrawals, and account balance. Subsequently to connecting to the server, the intelligent agent at the local site updates the local database of transaction and balance information. In an embodiment of the present invention, this update is accomplished by merging the local files with the newly downloaded files. Any necessary conversions between files from the server and locally used file format are performed automatically by the local software application. The files the intelligent agent receives upon default from the server are only those that relate to the latest transaction; the server maintains book marks to assure that only updated information is sent by default in order to minimize use of bandwidth during the transfer.

A more detailed description of the user interaction for an intelligent agent of the present invention follows. In an embodiment of the present invention, a local intelligent agent checks the date, based upon information downloaded from an intelligent agent server. The local intelligent agent searches for paying habit rules in the local rule file, searches the updated transaction history and searches the reminder file. Following these searches, the intelligent agent prompts the user with several possible alarms and reminders. An action button is shown on the screen for each warning and reminder. The warnings and reminders include: 1) Cleared checks; 2) Warning for pending payment; 3) Low balance alarm; 4) Uncleared due date payment; and 5) General Reminder.

When the action button for the cleared check reminder is selected, (for example, in a windows-based format by being "clicked on" by the user) a list of recently cleared checks is displayed. To change the local file and purge the displayed list of recently cleared checks, the merge file button is selected. If the merge button is not selected, the local file will not change, and the same list of recently cleared checks will appear the next time the action button for the cleared check reminder is selected.

A warning for a pending payment appears as a result of a system check for the current date and the due date for particular payments. A warning is only given if the due date is nearing or if a check for the payment has not cleared on or before the due date. An action button is provided to make these payments immediately by calling the payment module. Default information, such as the payee address, payee electronic transfer account number, date, and amount to be paid are automatically prompted by the system.

The low balance alarm warning is given when the balance of the user is lower than a threshold value selected by the user. There are two warnings in this case. One warning occurs if the actual balance of the user is lower than a predefined limit. Another warning is given when the debited balance of the user is lower than a predefined limit. It is important to note that a debited balance is different from an actual balance. A debited balance is the actual balance minus the total amount of uncleared payments. Debited balance is usually smaller than the actual balance and, in special cases, may even be smaller than zero. The lower limit can be set by the user or can be determined by the system from long-range financial goals, such as saving $200 each month for retirement. Another type of limit can be an accept range of expense totals by expense category.

The uncleared due date payment alarm occurs if a check has not been cleared on the due date or one day before the due date. In general, the action button provides the following advice in this situation: call the payee to inform the payee to wait for a certain number of days or cancel the check from the bank. The general reminder appears based upon user-selected preferences. The user can write anything desired to a reminder file and a desired reminder date. On the date selected, the system reminds the user.

In an embodiment of the present invention, the display of the warnings and alarms is followed by the appearance of the main menu prompted by the local application. The following buttons are among those displayed: 1) Check trace; 2) Expense category; 3) ATM trace; 4) Uncleared checks; 5) Reminder builder; 6) Making payment; and 7) Financial planning tool.

The check trace option gives a full list of checks paid. Each record in check trace contains the following information: check number, date written, date cleared, amount, payee name, and category. The user makes queries by check name, written date, cleared date, amount, category, and any combination of these query selections.

The expense category option provides a list of expenses made, including the amount and date of each expense. The ATM trace option provides a list of updated ATM transactions, including date, amount, and location of ATM transaction. The uncleared checks option provides a full list of uncleared checks.

The reminder builder allows the user to write a self-reminder of any special event. A reminder is a text file with user-specified data. The user can write virtually anything in this reminder. The user must provide a date when the reminder file will actually remind the user.

The making payment option is handled by the local software application. This enables the user to perform electronic transfer, print and mail checks, and warehouse payments. Warehousing payments will set up paying habit models in the system to give warnings to the user at specified dates or upon specified conditions.

The financial planning tool option consists of a variety of functions handled by the local software application.

In order to further describe an embodiment of the present invention, a detailed description of an example interaction of a user with a banking server application of the present invention is now described. This application is not intended to limit or restrict use of the invention to banking applications.

An embodiment of the present invention includes a customer facility, which may be either a stand alone workstation or a LAN. At the customer facility, the user accesses a financial software application. The user may have more than one financial software application. Upon accessing the financial software application, the user exports financial information from the financial software application into account files. Exported information includes bill payment rules, expense category data, or investment instructions.

From the account files, the user uploads user profiles, such as bill payment instructions or investment instructions, directly into a user account located at a bank or financial institution. From the user account, the user profile information is communicated to the bank or financial institution server. Such user profile information is utilized by intelligent agents or learning agents employed by the bank to create a user-specific financial profile.

The bank or financial institution learning agents monitor the data in the user account and provide advice messages to the user account. These advice messages include warnings about overdrafts or advice about new investment options matched to the specific user's financial profile. Additionally the user receives financial reports generated by bank-employed intelligent agents. The user accesses the advice, alarms, or reports generated by the bank-employed intelligent agents when the user obtains access to the user account at the bank.

The user communicates with the user account via an internet connection to the bank server. Via this internet connection, the user performs cone of a number of banking or financial institution transactions. For these transactions, the user utilizes a password or series of passwords to access the account. The transactions performed can include withdrawals, transfers, deposits, investments in stocks, bonds, mutual funds, futures or options, bill payments, and establishment of certificates of deposit or money market accounts. The user also deposits financial instructions with the bank regarding rules of bill payment or account establishment or investment.

Information obtained as a result of on-line banking transactions or as a result of obtaining updated user account data is downloaded into a downloaded data file. Financial information from downloaded data files is transferred into account files of the local software application. Intelligent agents interfacing with the account files are programmed or defined by the user to generate specific alarms or reminders, to perform account merger functions, or to alert the user to the failure to meet specific investment goals or the failure to keep spending on certain categories of user-defined expenses within monthly limits.

References will now be made in detail to an embodiment of the invention, an example of which is illustrated in the accompanying drawings.

FIG. 1 shows an overview of key components of the system for a banking application of an embodiment of the present invention. A user 1 at a terminal 2, such as a personal computer, accesses 3 a primary bank server 4 and a secondary bank server 5 via a network 6. According to an embodiment of the present invention, the user 1 accesses 3 the servers 4 and 5 using software, such as an applet, operating among the terminal 2, the network 6, and the servers 4 and 5.

Figure 2:
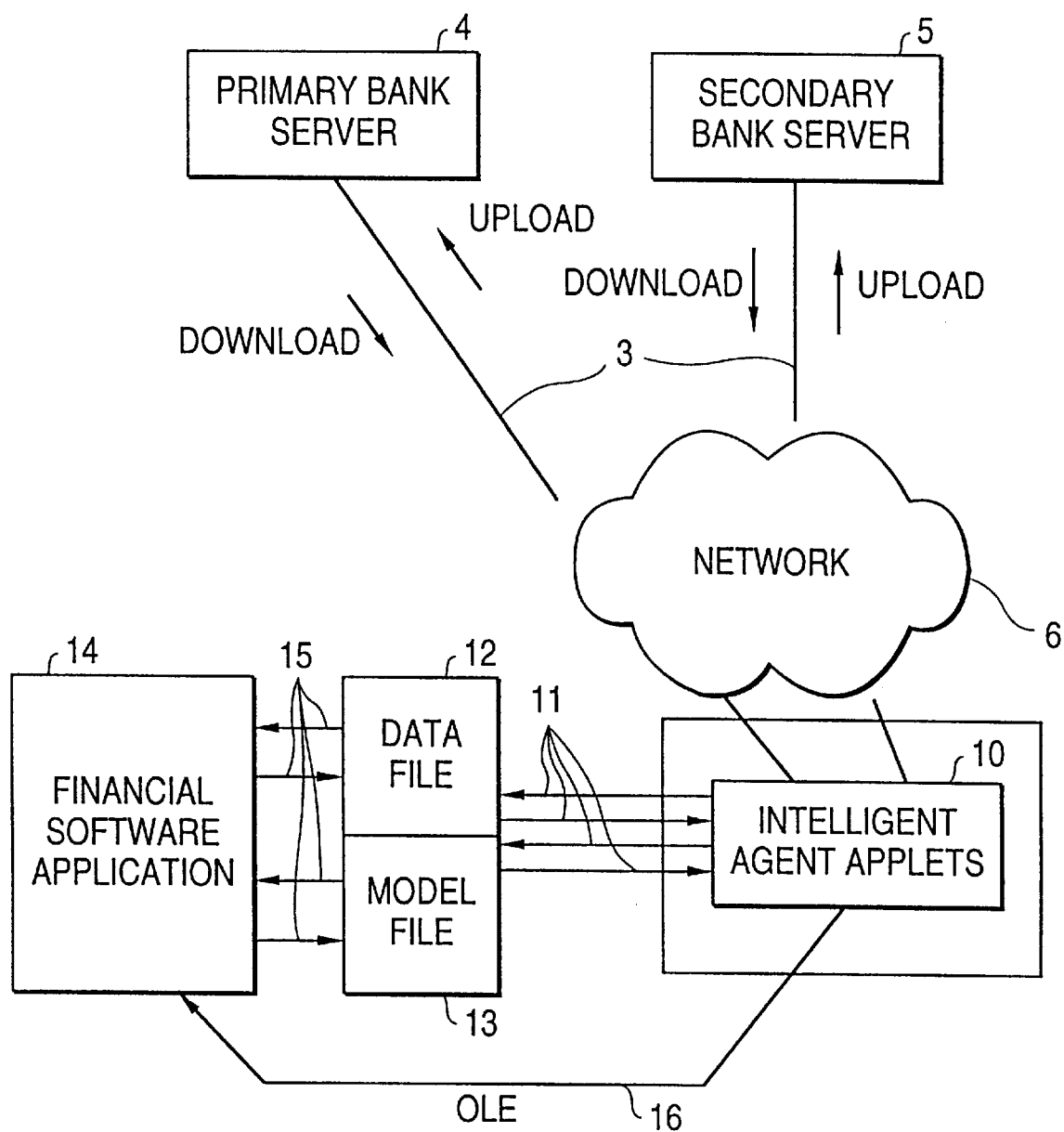
FIG. 2 schematically shows the flow of information from the various components of the system, whereby the user can access information and download information from a variety of sources.

FIG. 2 demonstrates the flow of information through the system. A primary bank server 4 functions as a repository for a variety of financial information. Through a network 6, such as the internet, a user at a terminal (not shown) connects 3, via the intelligent agent applet 10 using a proper protocol such as transport control protocol/internet protocol (TCP/IP) to the primary bank server 4, thereby permitting the user to upload financial information to the primary bank server 4 or to download financial information from the primary bank server 4. In cases where the user has accounts or financial transactions with more than one banking institution, the user accesses via the network 6 a secondary bank server 5. From the secondary bank server 5, the user also downloads financial information. Again the user may choose to upload financial information to the secondary bank server 5.

Via the connection 3, the user's downloaded information, from either the primary bank server 4 or from the secondary bank server 5, reaches the intelligent agent applets 10, which serve as the interface 11 and 3 between the network 6, including the servers 4 and 5, and the user's data file 12 and model file 13, located on a local terminal (not shown), such as a PC. The applets also communicate information between the network 6, the servers 4 and 5, and, the financial software application 14. The financial software application 14 may be housed locally on the terminal or on another server (not shown). The link between the network 6 and the financial software application 14 occurs via object linking and embedding protocol (OLE) 15.

Financial data flows 11 from the intelligent agent applets 10 to the data file 12 and the model file 13. Additionally financial data is sent 11 from the data file 12 or from the model file 13 to the intelligent agent applets 10. From the data file 12 and the model file 13, information is sent 15 to the financial software application 14, or information is sent 15 from the financial software application 14 to the data file 12 and the model file 13. Data is also sent directly 16 from the intelligent agent applets 10 to the financial software application 14 via OLE or from the financial software application 14 to the intelligent agent applets 10.

Figure 3:
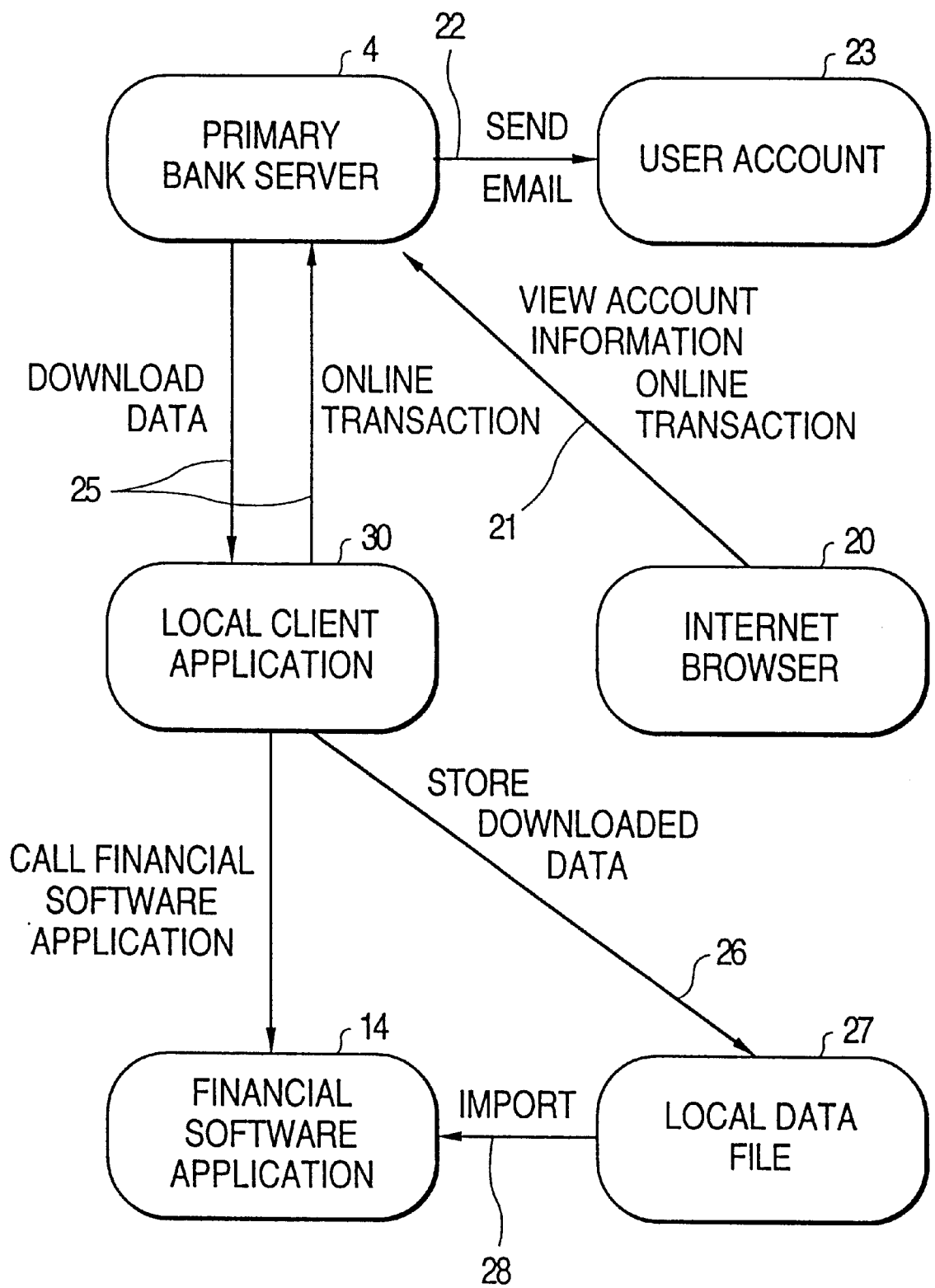
FIG. 3 shows the overall system architecture via a flow chart.

FIG. 3 is a flow chart demonstrating the overall system architecture. A user (not shown) utilizes an internet browser 20 to perform 21 an on-line transaction at the primary bank server 4. Additionally the user utilizes the internet browser 20 to connect 21 to the primary bank server 4 and view account information. As a result of any transaction performed by the user in connection with the primary bank server 4, the primary bank server 4 sends 22 a message, such as by electronic mail, regarding any relevant transactional confirmation, description, or associated charges to the user account 23.

A local client application 24 is compatible with the proper communication mode and language of the primary bank server 4. This enables the user to utilize the local client application 24 to perform an on-line transaction by connecting 25 to the primary bank server 4. Moreover, the user utilizes the local client application 24 to receive 25 downloaded financial data from the primary bank server 4.

Downloaded financial data received via the local client application 24 is stored 26 in the local data file 27. The financial data stored in the local data file 27 is imported 28 into the financial software application 14. Alternatively the local client application 24 can call the financial software application 14 directly 30, thereby enabling exchange of data between the local client application 24 and the financial software application 14.

Figure 4:
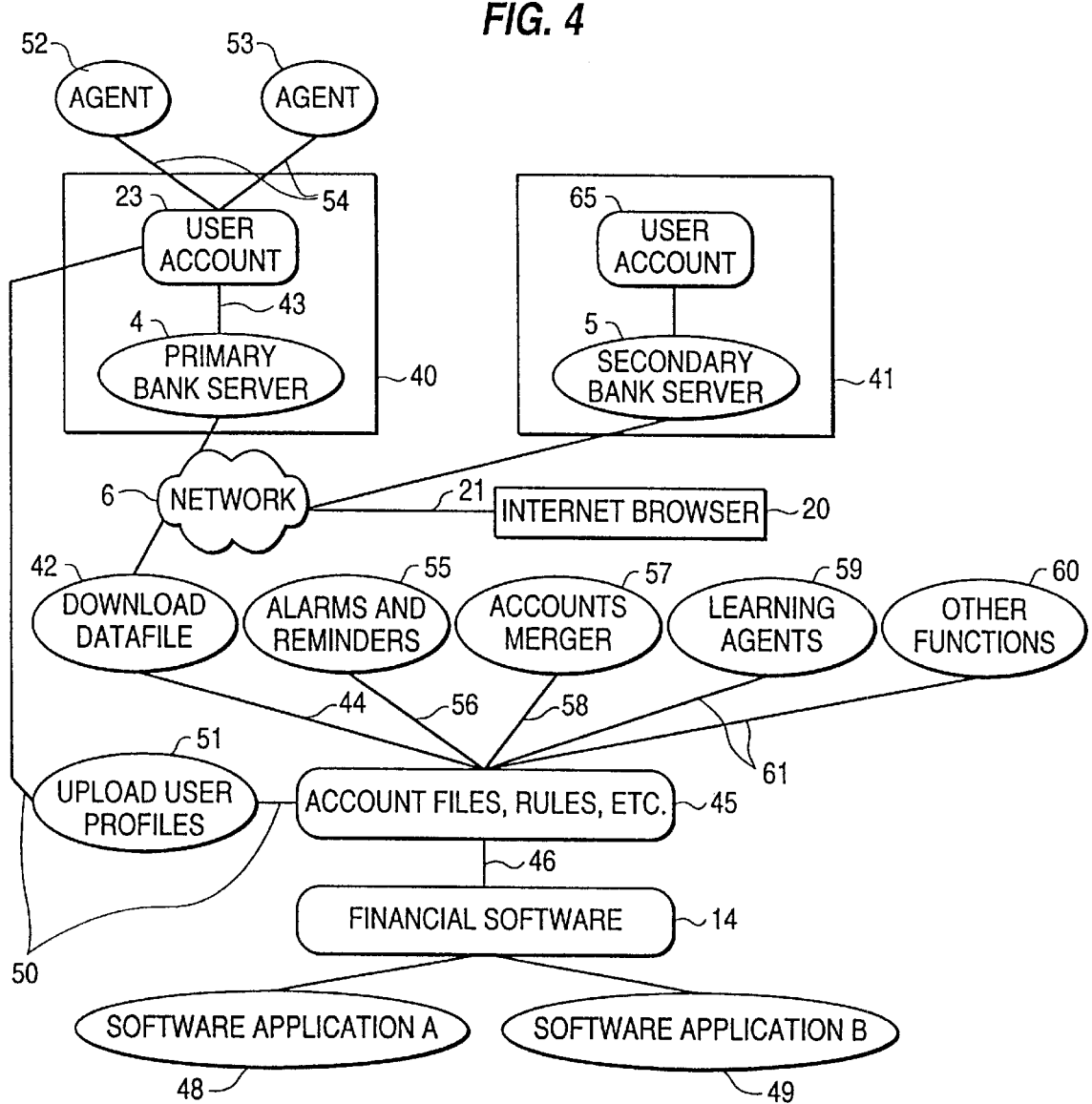
FIG. 4 also schematically shows the system and incorporates the intelligent agents, thereby demonstrating the possible functions and roles played by the intelligent agents in the system.

FIG. 4 is a flow chart which amplifies the basic outline of the information flow demonstrated in FIG. 2 and the overall system architecture shown in FIG. 3. In addition, FIG. 4 provides further detail regarding the role of intelligent agents or learning agents.

As shown in FIG. 4, the user using an internet browser 20 connects 21 via a terminal (not shown), such as a PC, through a network connection 6 to a primary bank 40 or to a secondary bank 41. Via the network 6, the user downloads data files 42 from the primary bank server 4 or from the secondary bank server 5 of the primary bank 40 or the secondary bank 41, respectively. In the case of the primary bank server 4, financial information is communicated 43 from the primary bank user account 23 to the primary bank server 4, and the primary batik server 4 downloads the information upon request by the user to a downloaded data file 42 via the network connection 6. This downloaded data file 42 is incorporated 44 by the user into the account files 45 so that the account files 45 are maintained as current. From the account files 45, the user communicates 46 financial data to financial software applications 14. In some cases, the user chooses to have two or more types of financial software applications 48 and 49. For example, the user may have one software application A, 48, which keeps a database of expenses and income. Another software application B, 49, enables the user to maintain a financial transaction and investment database.

An additional feature of the present invention shown in FIG. 4 is the capability for the user to transfer 50 user files 51 directly from the account files 45 to the primary bank user account 23. In this way, the user transfers financial data or messages into the user account 23, which permits the user to accomplish a variety of financial tasks, such as modifying the date that automatic payments are made for mortgages or for automobile loans.

Another aspect of the present invention is shown in FIG. 4, in which agents, such as intelligent and/or learning agents 52 and 53 employed by the primary bank 40 monitor a user's financial transactions, including withdrawals, transfers, and investments, so that the intelligent agents 52 and 53 create a user-specific profile that is available only to the user to advise the user of improved ways of investing, notify the user of different types of accounts that the user may want to create at the primary bank 40, or generate a report for the user detailing all or part of the user's financial history at the primary bank 40. The information is gathered and analyzed by the intelligent or learning agents 52 and 53 is communicated 54 to the user account 23. In this way, the user may access and download this information when the user has connected 21 to the user's account 23 via a network connection 6 to the primary bank server 4. Ultimately the user downloads the information created by the learning agent 52 and/or 53 to a downloaded data file 42. As with other financial information or data downloaded from the primary bank server 4, the user chooses to place the downloaded data file 42 from one of the learning or intelligent agents, 52 and/or 53, into the account files 45. Again the user transfers 46 such an account file 45 into the financial software 14, thereby allowing the data from the learning or intelligent agents, 52 and/or 53, to be incorporated into the financial software 14. The user also transfers 46 data or information from the financial software 14 to the account files 45.

Yet another aspect of the present invention shown in FIG. 4 is the function of a variety of different proactive features of the system that communicate directly with the account files 45. As part of the system, features, such as intelligent agents, act as proactive financial alarms and reminders 55 as they monitor 56 data that accumulates in the account files 45, such as rules for payments to be made to creditors or rules for investments to be made at financial institutions. In an embodiment of the present invention, the alarms and reminders 55 utilize the account files 45 to create a special form of advice for users. For example, this advice takes the form of a payment alarm communicated 56 from the intelligent agent alarms and reminders 55 to the account files 45, from which the user imports the information reminding the user to pay a bill into his financial software 45.

Another feature of the intelligent agents that communicates directly with the user's account files includes the accounts merger feature 57, which generates a report for the user which tracks all of the user's expenses, income, investments, and tax information. This information generated is communicated 58 to the account files 45. In this way the accounts merger feature 57 serves to reconcile statements from the primary bank 40 or from the secondary bank 41 with respect to items such as payee, check or transaction number, expense category, and amount. Additionally the accounts merger gives the user a comprehensive picture of the user's financial history, projects numbers for the user's financial future, or generates user-specific reports on a subset of the user's financial data.

FIG. 4 also shows that various learning agents 59 and other intelligent agent-based functions 60 communicate 61 directly with the account files 45 to give other specific forms of advice or to generate specific types of reports. For example, in an embodiment of the present invention, the user employs a learning agent 59 to monitor a user-defined category of expenses, such as restaurant expenses. When the user records the restaurant expenses in his financial software 14, the user transfers that information to the account files 45, where the learning agent 59 acts as a monitor. When the user's defined restaurant expense spending limit for the month is exceeded, the learning agent 59 notifies the account files 45. In turn, the account files 45 notify the user that the learning agent 59 has delivered a message that monthly restaurant expenses have been exceeded.

In an embodiment of the present invention, other agent-based functions 60 include such things as an intelligent agent employed to monitor the growth of investment income. The user establishes certain investment goals, which the intelligent agent 60 monitors. As the investments are made with financial institutions, such as the primary bank 40 or the secondary bank 41, the user accesses the primary bank server 4 or the secondary bank server 5 via a network connection 6 to make investments or to transfer updated investment data to a downloaded data file 42. This information is then transferred into an account file 45, and the other function intelligent agent 60 monitors and tracks the data. When certain user-defined goals are not being achieved, for example, the other function intelligent agent 60 notifies the account files 45 with a message. This message is available to the user the next time that the user accesses the account files 45 from the financial software 14.

Figure 5:
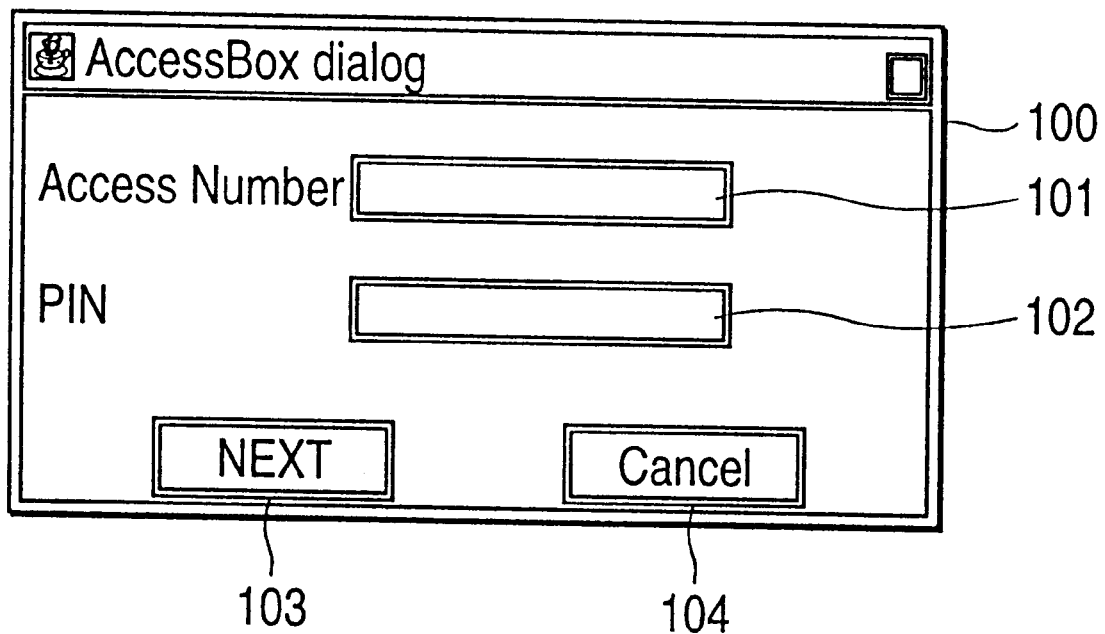
FIG. 5 is a login window.

An embodiment of the present invention includes a windows-based graphical user interface (GUI) for a user to access the functions of the system. Once the user enters the system, the user is presented with a window that includes pull-down menus. These pull-down menus include a menu for Account. Within the Account menu is a selection for Open. As shown in FIG. 5, when the user selects Open from the Account menu, a pop-up screen 100 appears for user logon, as shown in FIG. 5. The user inputs an access number 101 and a Personal Identification Number (PIN) 102. After inputting this information, the user selects Next 103 to proceed or Cancel 104 to cancel the opening of the account.

Figure 6:
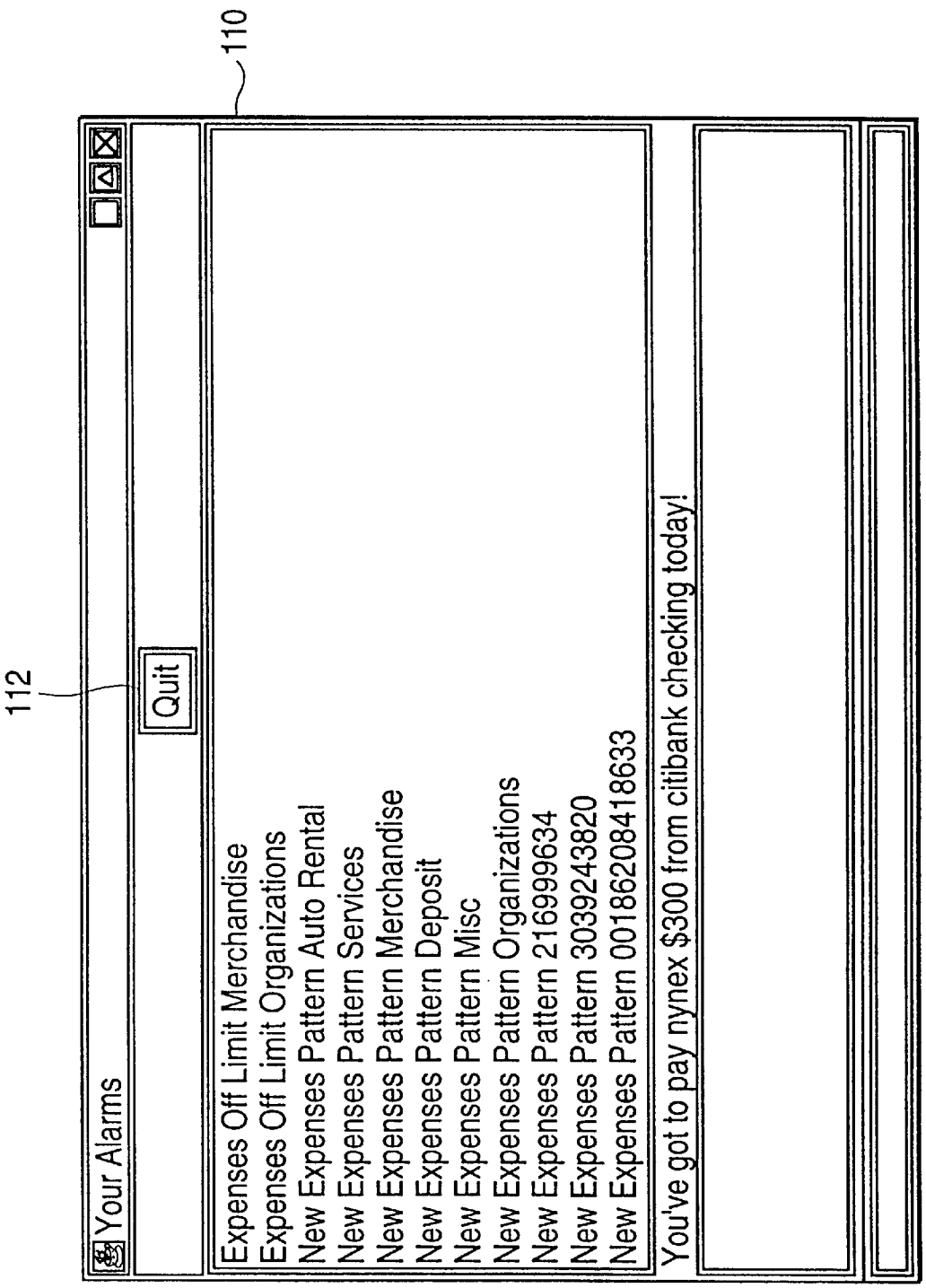
FIG. 6 shows an alarm window.

After selecting Next 103 in FIG. 5, if the appropriate Access Number 101 and PIN 102 have been inputted by the user, an alarm window 110 appears, as shown in FIG. 6. This alarm window 110 provides various information to the user based on preselected alarms. For example, the alarm window 110 may inform the user that "You've got to pay nynex $300 from citibank checking today!" 111. After viewing the alarm window 110, the user can select the button to quit 112.

Figure 7:
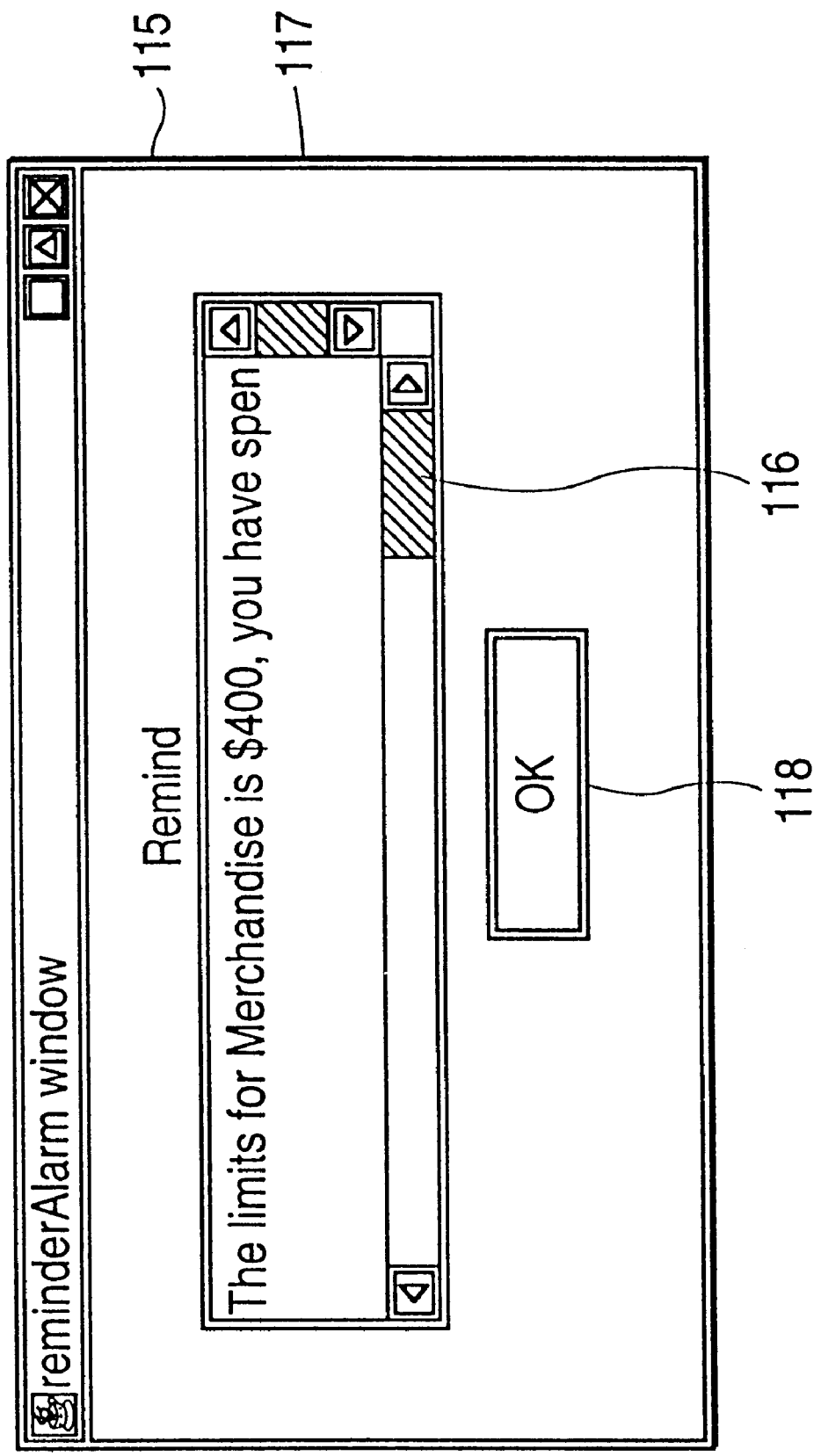
FIG. 7 presents a reminder window.

Within the alarm window 110, as shown in FIG. 6, the user can obtain more details on a particular alarm by selecting that alarm. A pop-up window 115, as shown in FIG. 7, appears to provide more details on items selected that are reminders. The user can scroll among the text of the details using the scroll bars 116 and 117. The user selects the OK button 118 when finished.

Figure 8:
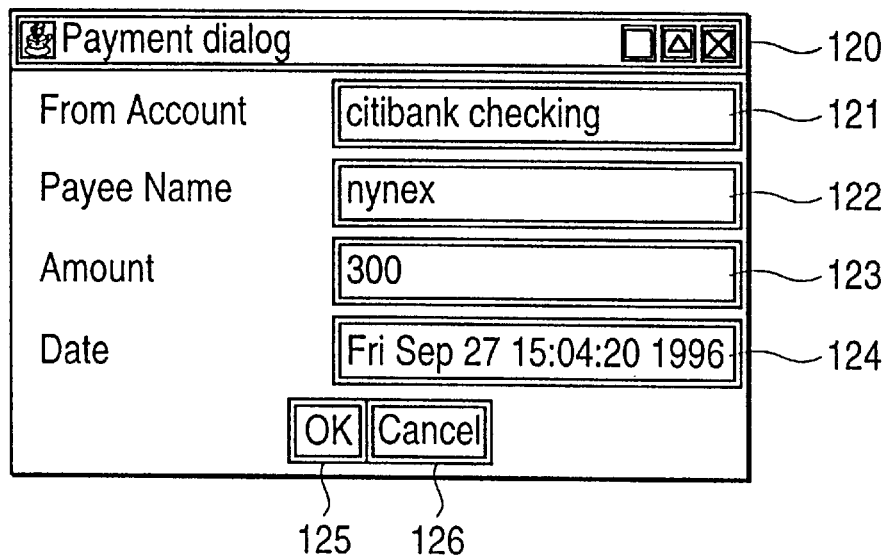
FIG. 8 is a payment reminder window.

If the alarm within the alarm window 110, as shown in FIG. 6, relates to a payment reminder, the details shown when the user selects the alarm differ from those for any other type of reminder. As shown in FIG. 8, a window 120 appears containing information about From Account 121, Payee Name 122, Amount 123, and Date due 124. The user can select OK 125 to automatically make the payment or Cancel 126 to not make the payment. If the payment alarm is a periodic payment, such as monthly, the alarm will recur each period.

Figure 9:
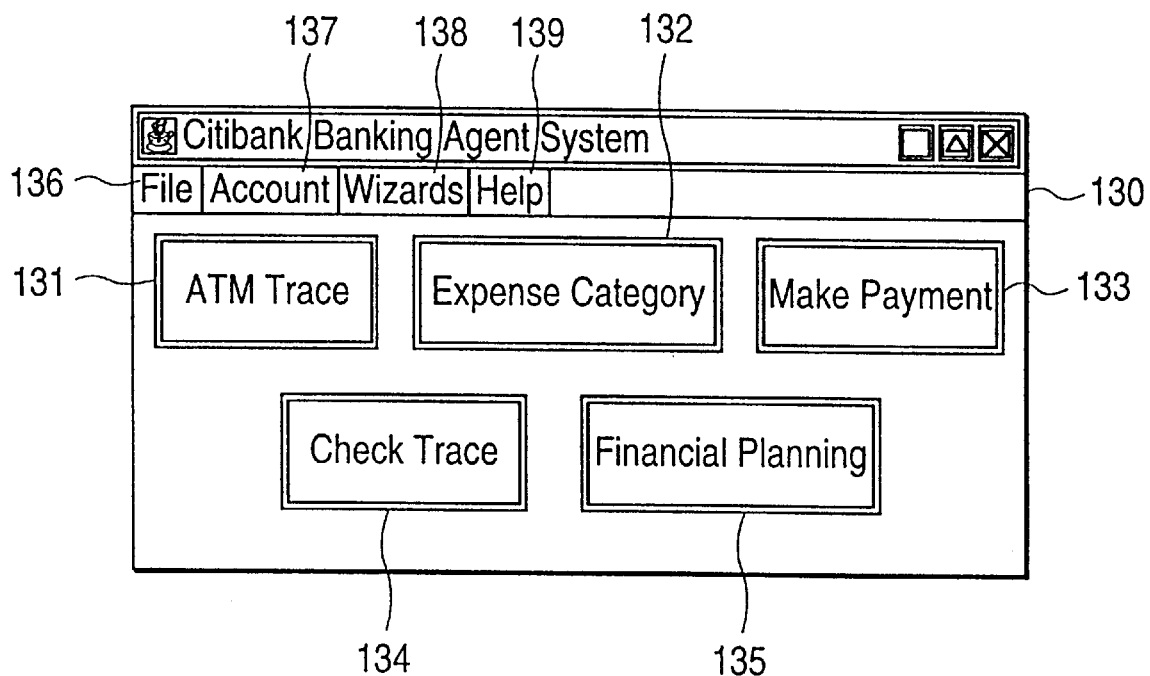
FIG. 9 shows a main window with pulldown menus and menu buttons.

If the user selects Quit 112 in the Alarm window 110, as shown in FIG. 6, a menu screen 130 appears, as shown in FIG. 9. The menu 130 includes buttons for ATM Trace 131, Expense Category 132, Make Payment 133. Check Trace 134, and Financial Planning 135. In addition, a series of pulldown menus are included at the top of the window 130. These pulldown menus include File 136, Accounts 137, Wizards 138, and Help 139.

The File 136 pulldown menu in FIG. 9 contains a selection to Exit the system.

Figure 10:
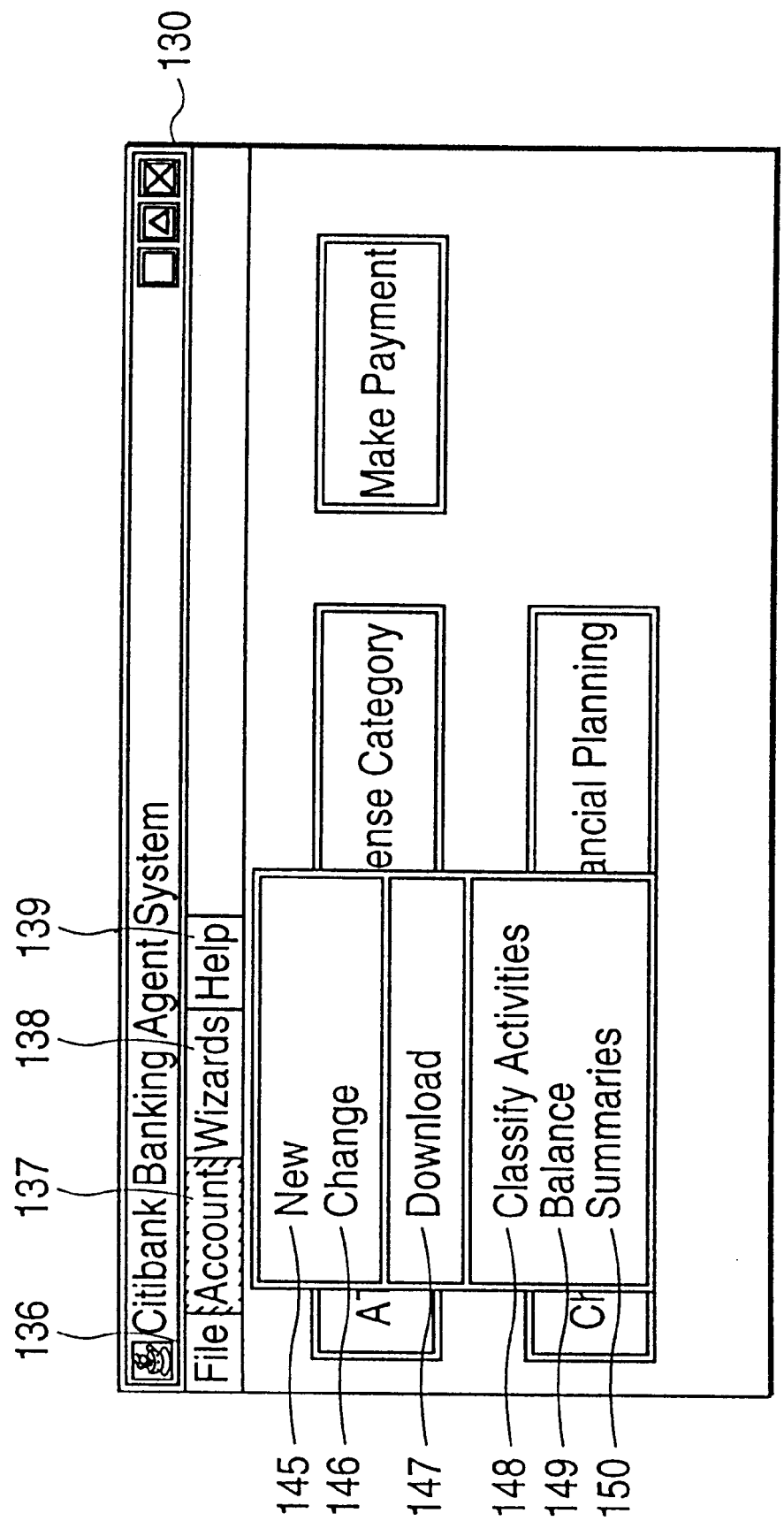
FIG. 10 contains the accounts pulldown menu.

As shown in FIG. 10, if the user selects Accounts 137, at pulldown menu appears that includes New 145, Change 146, Download 147, Classify Activities 148, Balances 149, and Summaries 150.

Figure 11:
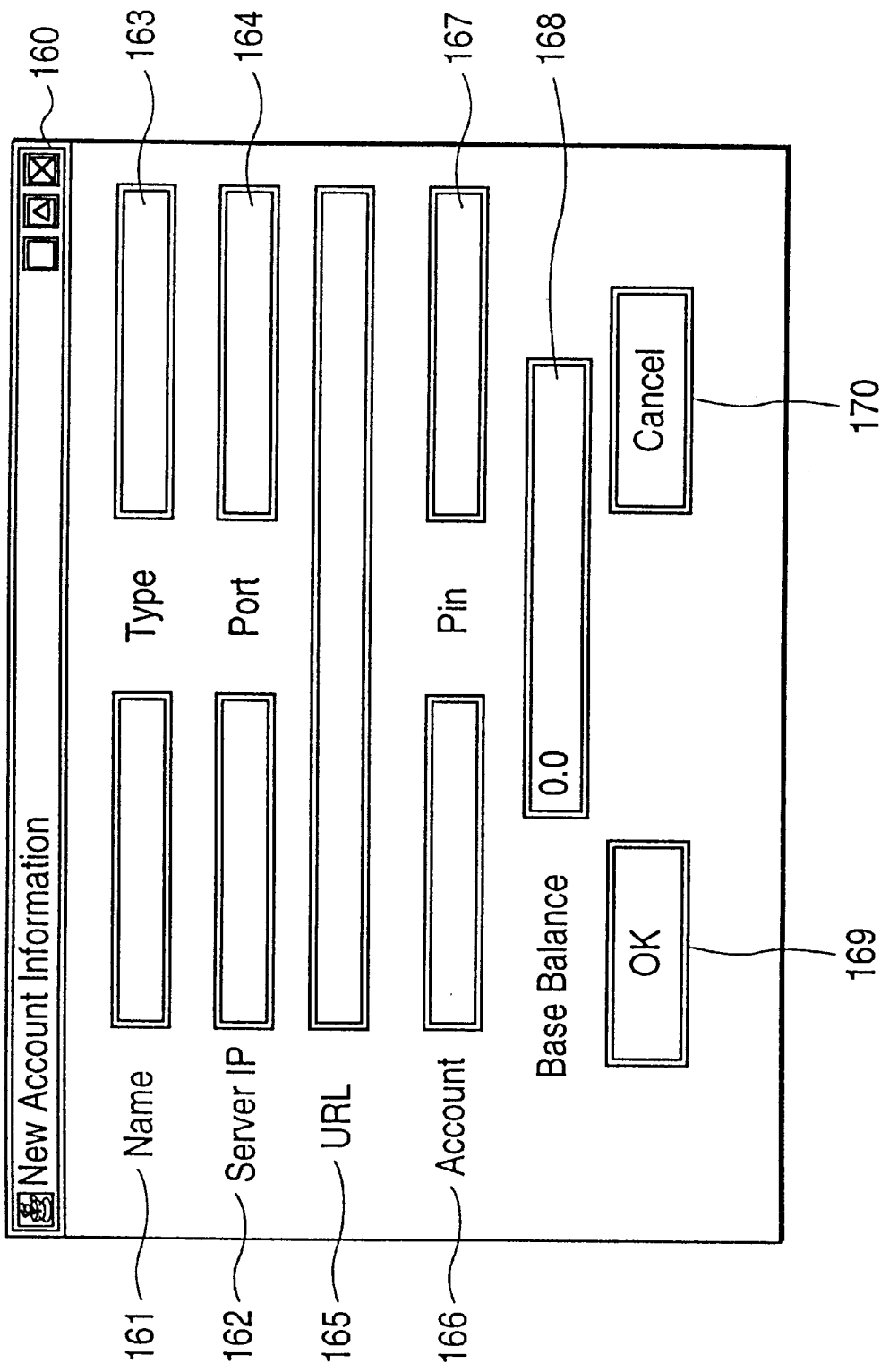
FIG. 11 presents the new account window.

If the user selects New 145 from the Accounts 137 menu, as shown in FIG. 10, a pop-up window 160 appears, as shown in FIG. 11. The user then inputs information about the new account. This information includes Name 161, Server IP 162, Type 163, Port 164, URL 165, Account 166, PIN 167, and Base Balance 168. The user selects OK 169 after inputting information or Cancel 170 to exit the pop-up window.

Figure 12:
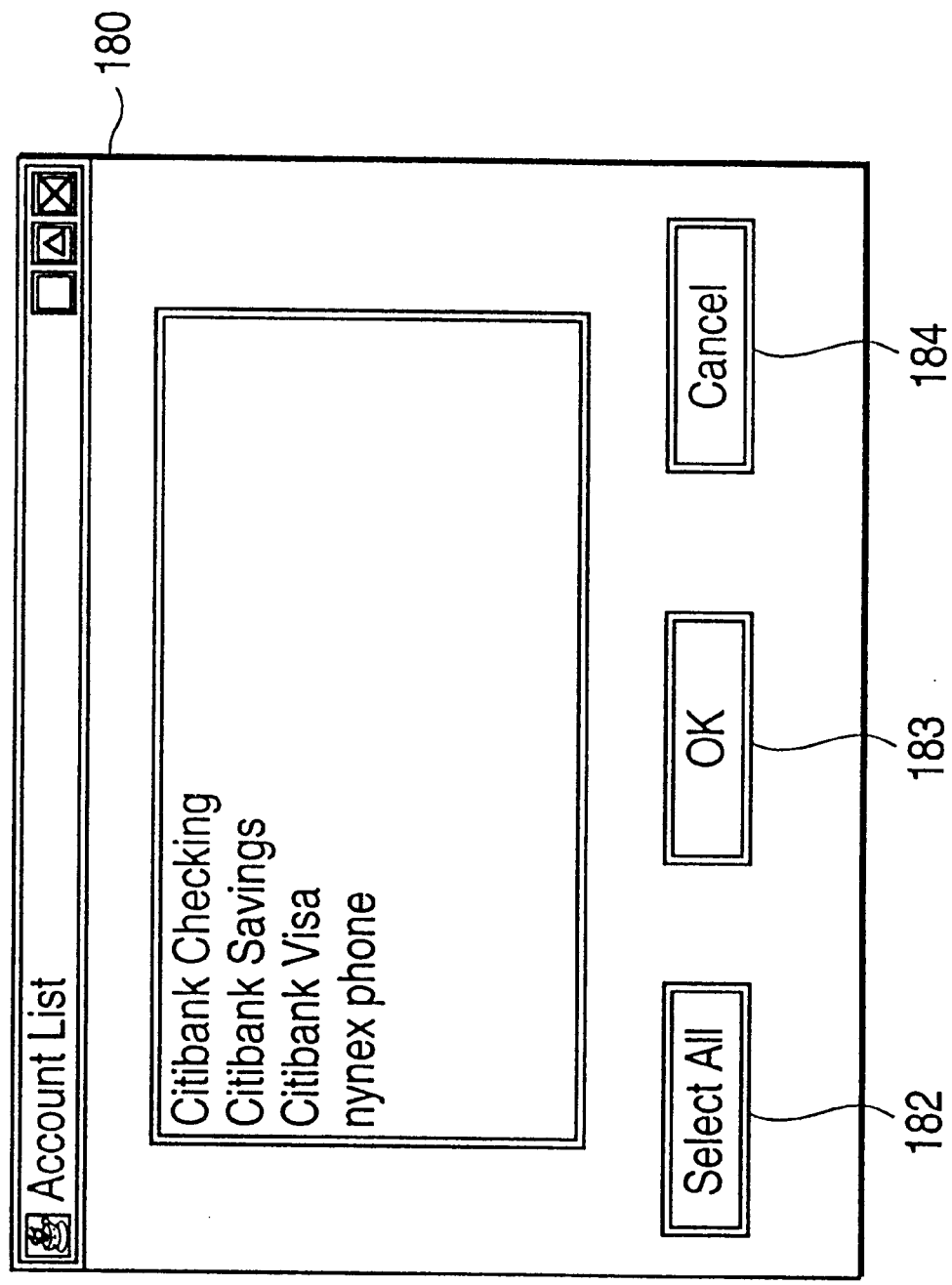
FIG. 12 is the account list window.

In FIG. 10, if the user selects Download 147, a pop-up window 180 appears, as shown in FIG. 12. This window 180 includes a list of accounts 181 from which the user may select. Also included are buttons to Select All 182, OK 183 to accept a selection, and Cancel 184 to cancel a selection. After selecting OK 183, the system proceeds to download the selected files.

In FIG. 12, the user can process an item on the list 181 by double clicking on a selected item. Double clicking produces another pop-up window 190, as shown in FIG. 13A. The information provided for processing includes Date 191, Amount 192, Status 193, Category 194, Check Number 195, Payee/Description 196, Address 197, and Memo 198. The user can select OK 199 if the information is correct, Delete 200 to delete the detail, or Cancel 201.

Figure 13B:
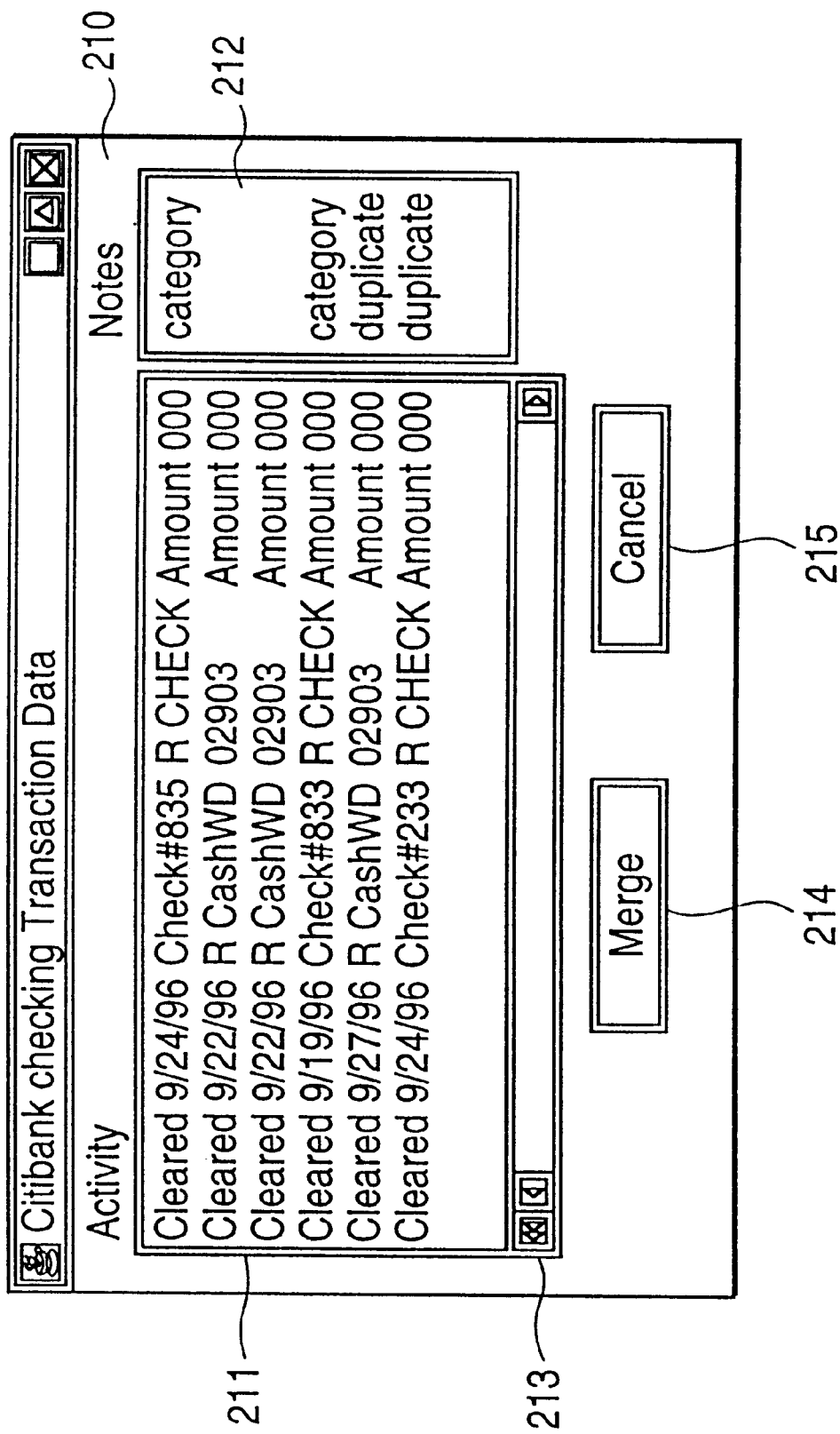
FIG. 13B shows the account activities pop-up window.

The user may then merge the newly downloaded activity on the account list 181, as shown in FIG. 12. After selecting OK 199 in FIG. 13A, a pop-up window 210 appears, as shown in FIG. 13B. This pop-up window 210 includes an Activity section 211, a Notes section 212, and a scroll bar 213 for the user to scroll among information in the Activity section 211. The user can select to Merge 214 the new information into the stored local information or Cancel 215.

Figure 14:
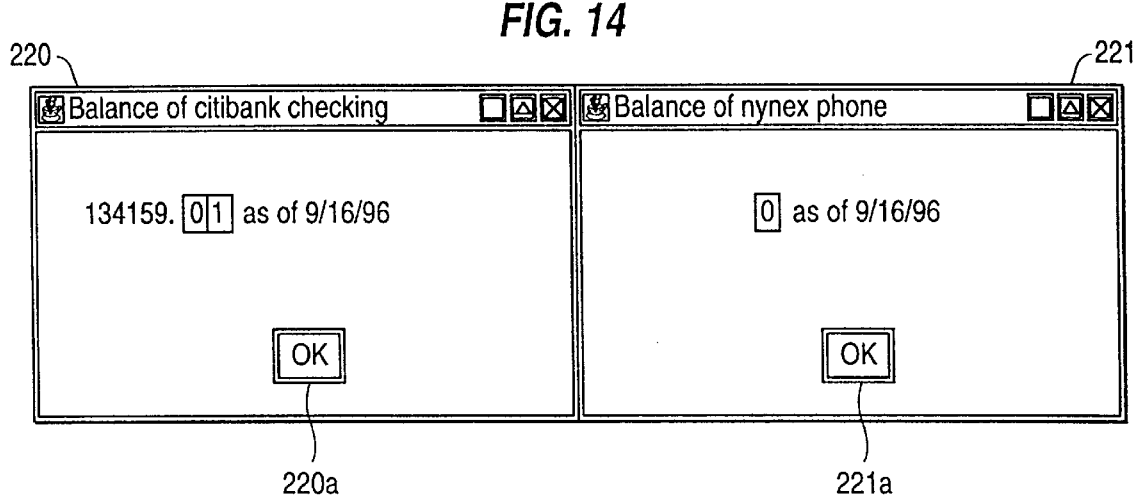
FIG. 14 contains the display balances windows.

In FIG. 10, if the user selects Balances 149 from the Accounts menu 137, pop-up windows appear, such as those for checking 220 and phone 221, as shown in FIG. 14. After reviewing, the user selects OK 220a and 221a to return to the menu shown in FIG. 9.

Figure 15:
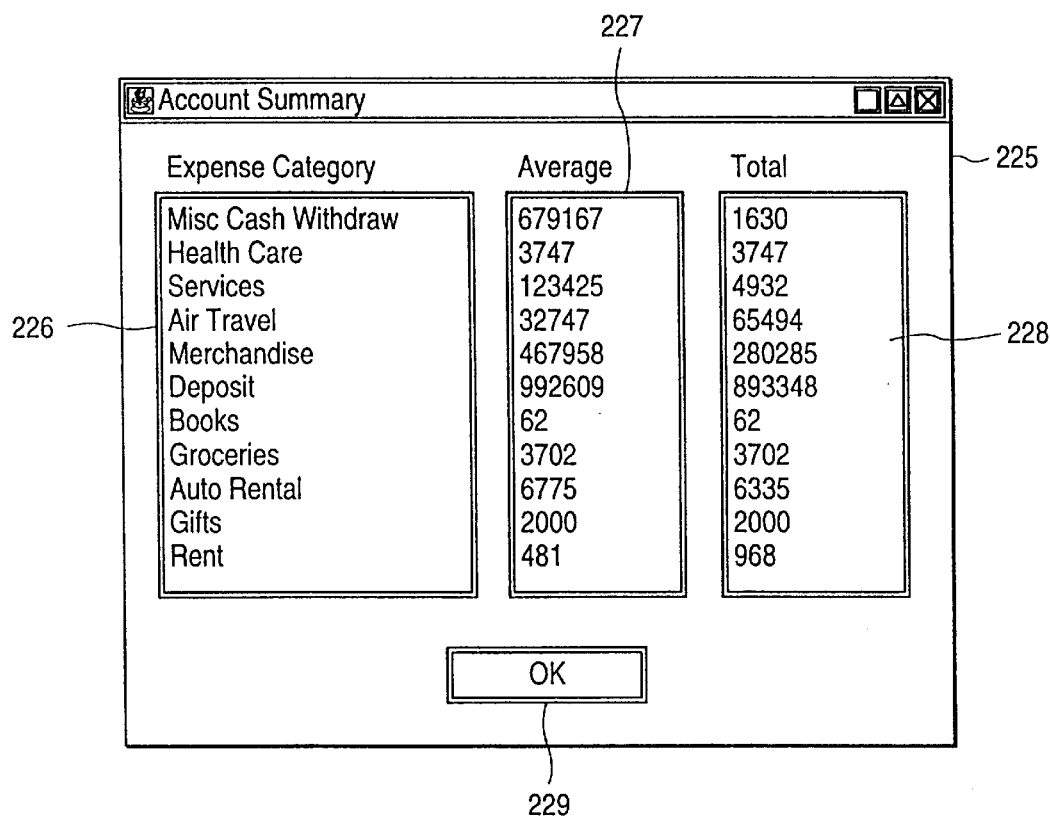
FIG. 15 is the account summary pop-up window.

In FIG. 10, if the user selects Summaries 150 from the Accounts menu 137, a pop-up window 225 appears, as shown in FIG. 15. This window 225 includes an Expense Category section 226, an Average balance section 227, and a cumulative Total of transactions section 228. The user may select OK 229 to return to the menu shown in FIG. 9.

Figure 16:
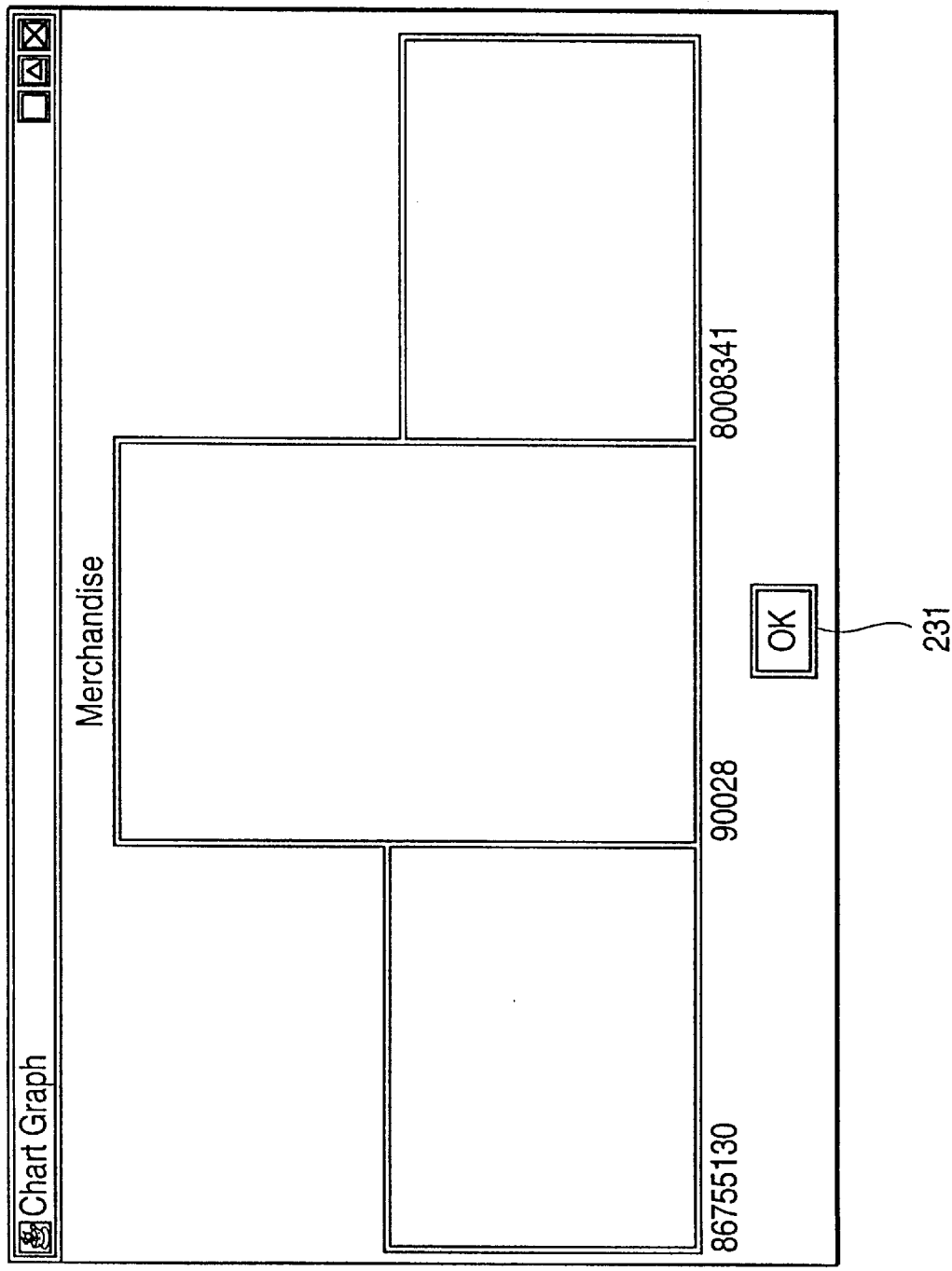
FIG. 16 presents an expense category bar chart.

In FIG. 15, if the user double-clicks on a selected item in the Expense Category 226, a pop-up window 230 appears, as shown in FIG. 16. The bar chart includes detailed information on the monthly expenditures for that category. The user selects OK 231 to return to the Account Summary pop-up window 225, as shown in FIG. 15.

Figure 17:
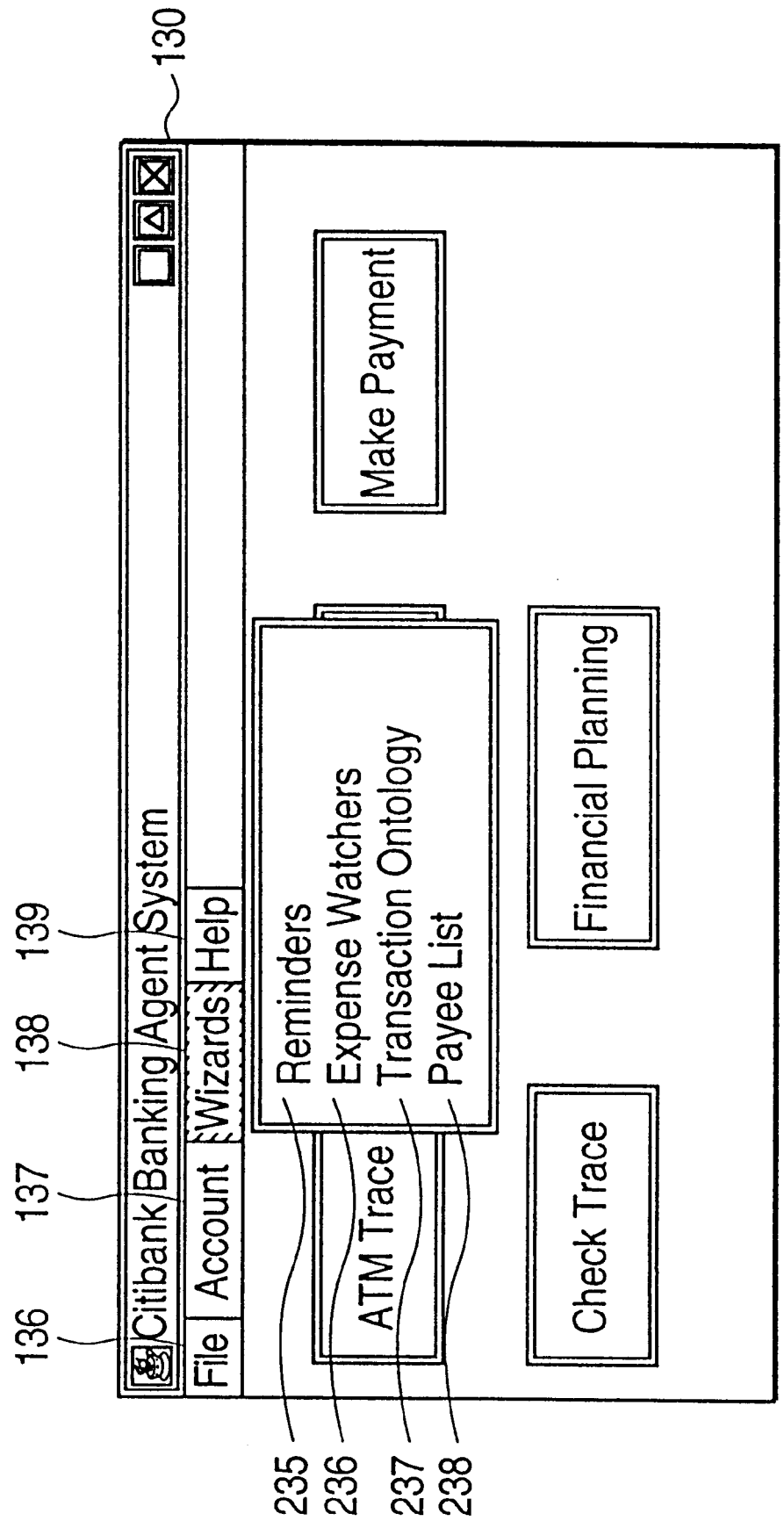
FIG. 17 shows a window containing the wizard pulldown menu.

In FIG. 9, if the user selects the Wizards menu 138, a list of menu items appears, as shown in FIG. 17. These menu items include Reminders 235, Expense Watchers 236, Transaction Ontology 237, and Payee List 238.

Figure 18:
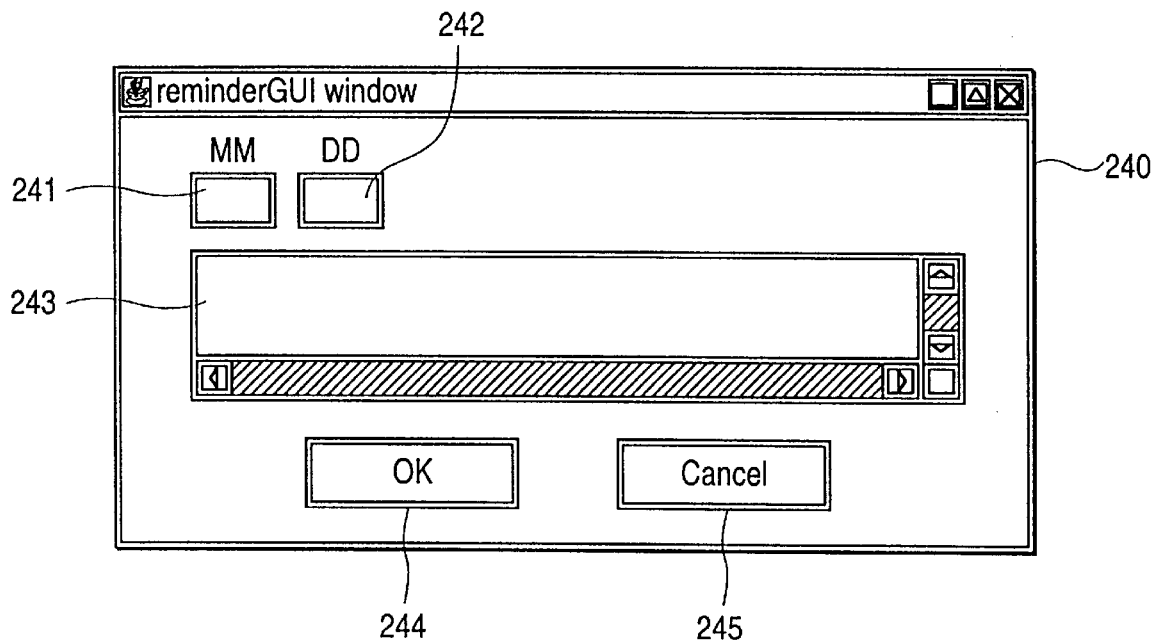
FIG. 18 contains the reminder GUI window.

In FIG. 17, if the user selects Reminders 235 from the Wizards menu 138, a pop-up window 240 appears, as shown in FIG. 18. This pop-up window 240 allows the user to set reminders. Information to be input in the window 240 by the user includes Month 241, Day 242, and reminder text 243. The user selects OK 244 after completing input or Cancel 245 to cancel.

Figure 19:
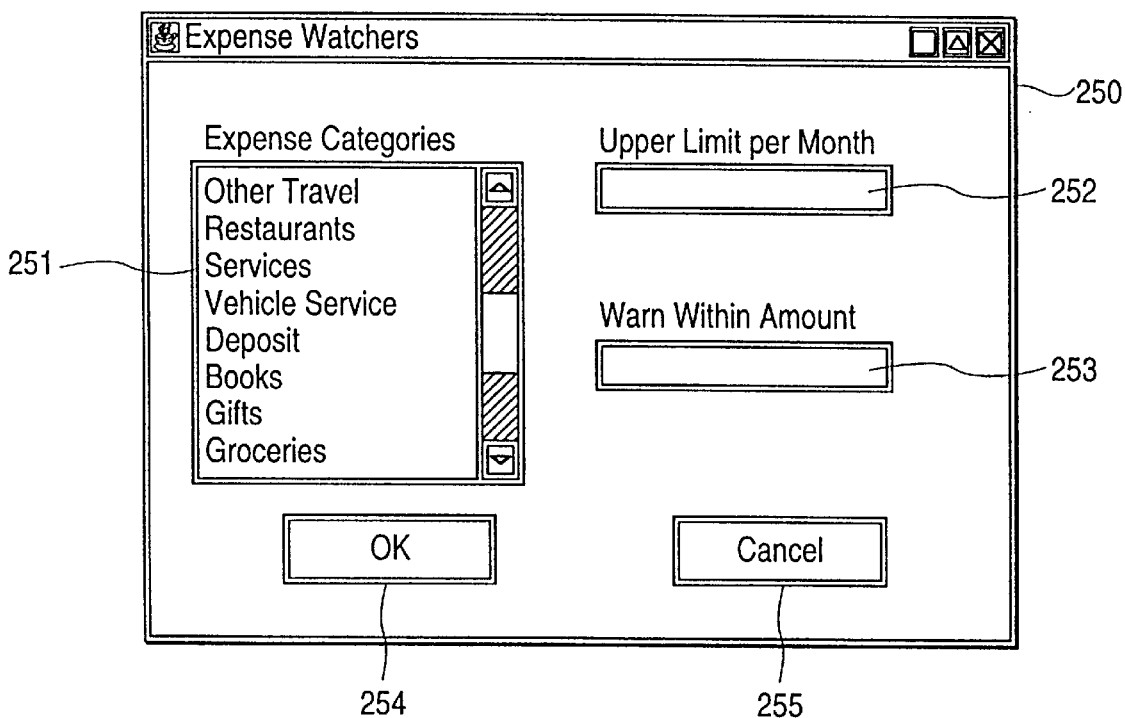
FIG. 19 shows the expense watchers pop-up window.

In FIG. 17, if the user selects Expense Watchers 236, a pop-up window 250 appears, as shown in FIG. 19. The expense watcher observes transactions in a given category across all accounts and causes warnings and alarms when thresholds specified by the user are approached or exceeded. To set a watcher, the user selects an Expense Category 251, an Upper Limit per Month 252, and a Warn Within amount 253. After inputting information the user may select OK 254 or Cancel 255.

Figure 20:
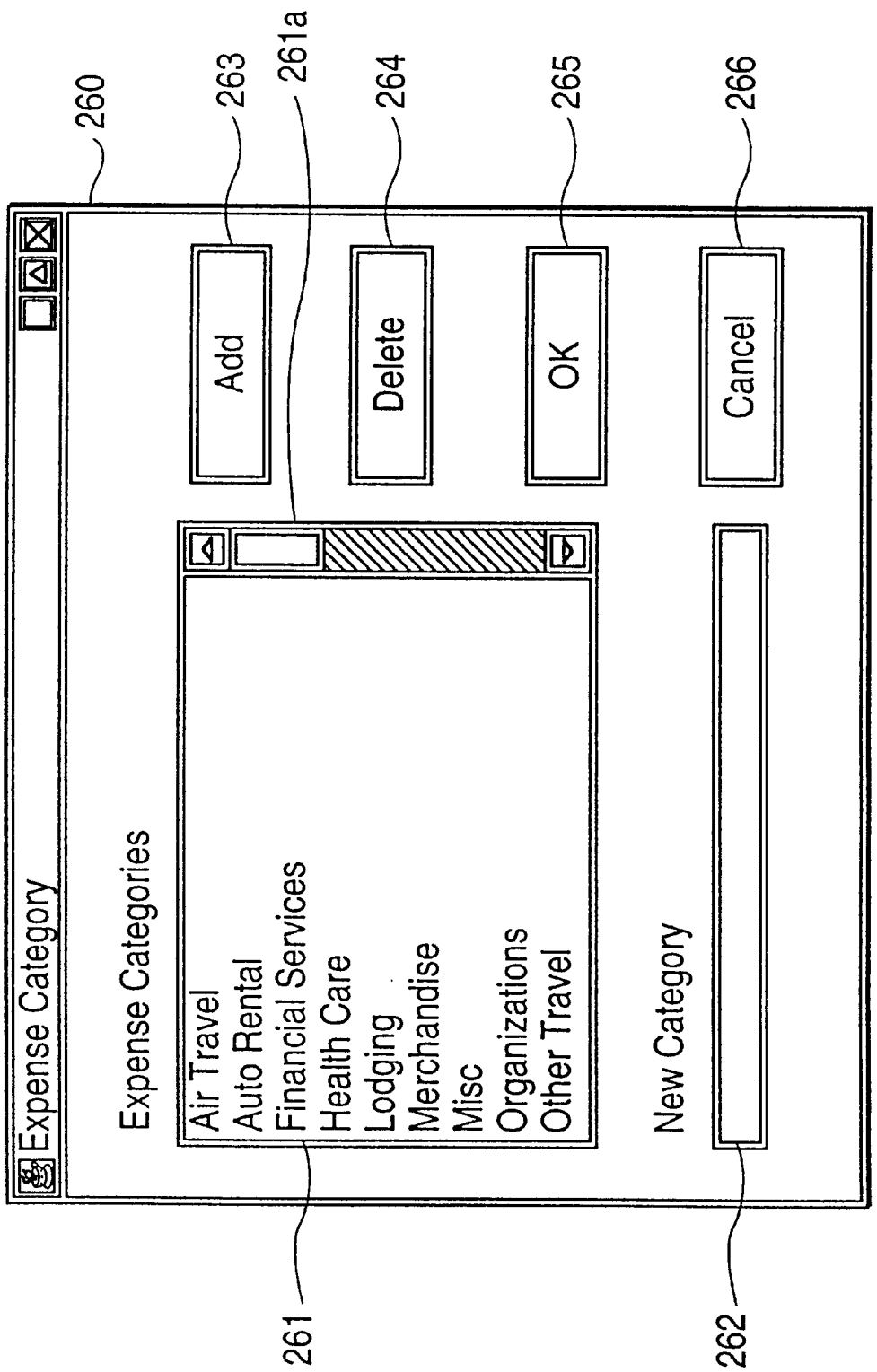
FIG. 20 is the expense category window.

In FIG. 17, if the user selects Transaction Ontology 237 from the Wizards menu 138, a pop-up window 260 appears, as shown in FIG. 20. This option allows the user to specify new expense categories for the user's accounts. The window 260 includes Expense Categories 261 with a scroll bar 261a. The user may list a New Category 262 and use buttons to Add 263 the New Category 262 inputted, or Delete 264 selected Expense Categories 261. The user selects OK 265 when finished or Cancel 266 to cancel.

Figure 21:
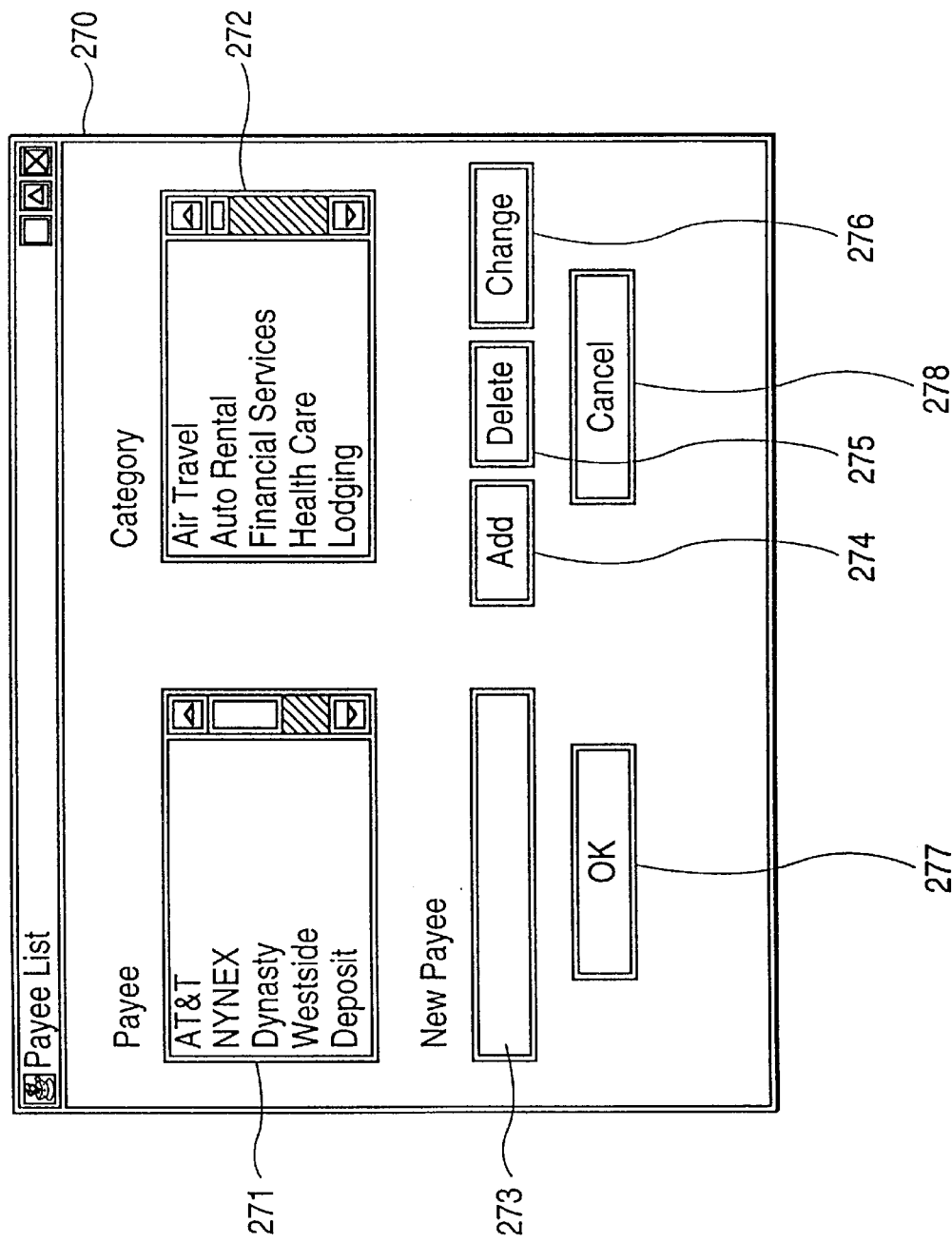
FIG. 21 shows the payee list pop-up window.

In FIG. 17, if the user selects Payee List 238 from the Wizards menu 138, a pop-up window 270 appears, as shown in FIG. 21. The payee list is the list of most frequently used payees and their expense categories, which are stored for use in the online banking functions. The window 270 includes a list of Payees 271, a list of Categories 272, a section for the user to input the name of a New Payee 273, and buttons to Add 274 the new payee, Delete 275 a selected payee, or Change 276 a category of a payee. The user can keep changes by selecting the OK button 277 or Cancel 278 changes.

Figure 22B:
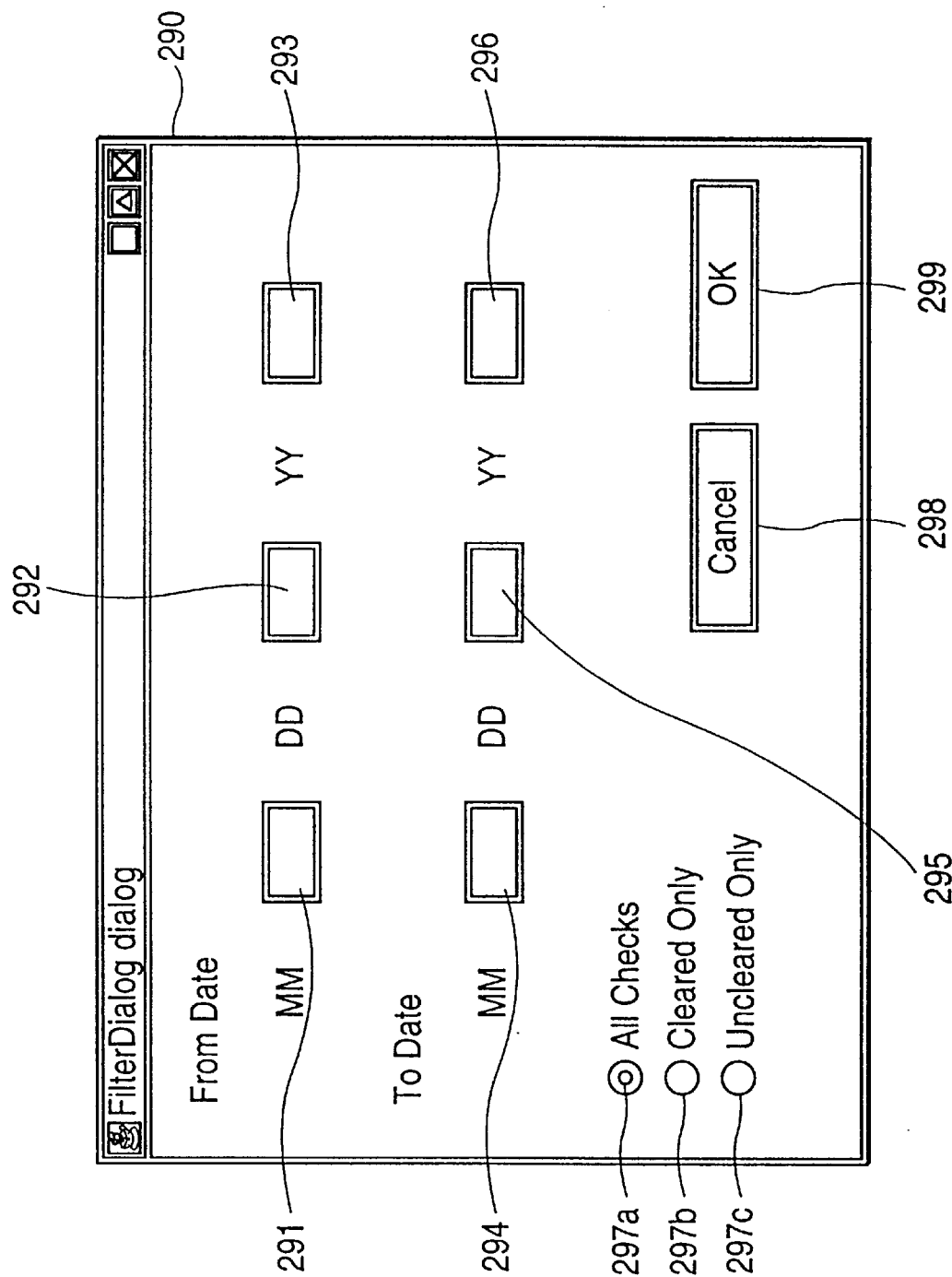
FIG. 22B is the check filter dialog window.

In FIG. 9, if the user selects the button for ATM Trace 131 or Check Trace 134, the Account List window 180, as shown in FIG. 12, appears. The user then selects a savings or checking account from the account list 181 and then selects the button for OK 183. The pop-up windows 280, shown in FIG. 22A and 290, shown in FIG. 22B appear, respectively, for ATM and Check filters. From the ATM filter window 280, the user selects a month 281, day 282, and year 283 for the trace to begin and a month 284, day 285, and year 286 for the trace to end. If no date is entered for the beginning date, the trace will start at the first transaction; if no date is entered for the end date, the default is the current date. For the check filter, the user also enters a beginning month 291, day 292, and year 293 and an ending month 294, day 295, and year 296. For check filter, the user also selects whether to include All Checks 297a, Cleared Only 297b, or Uncleared Only 197c. The user then selects OK 288 and 299, for FIGS. 22A and 22B, respectively, or Cancel 287 and 298, respectively.

Figure 23A:
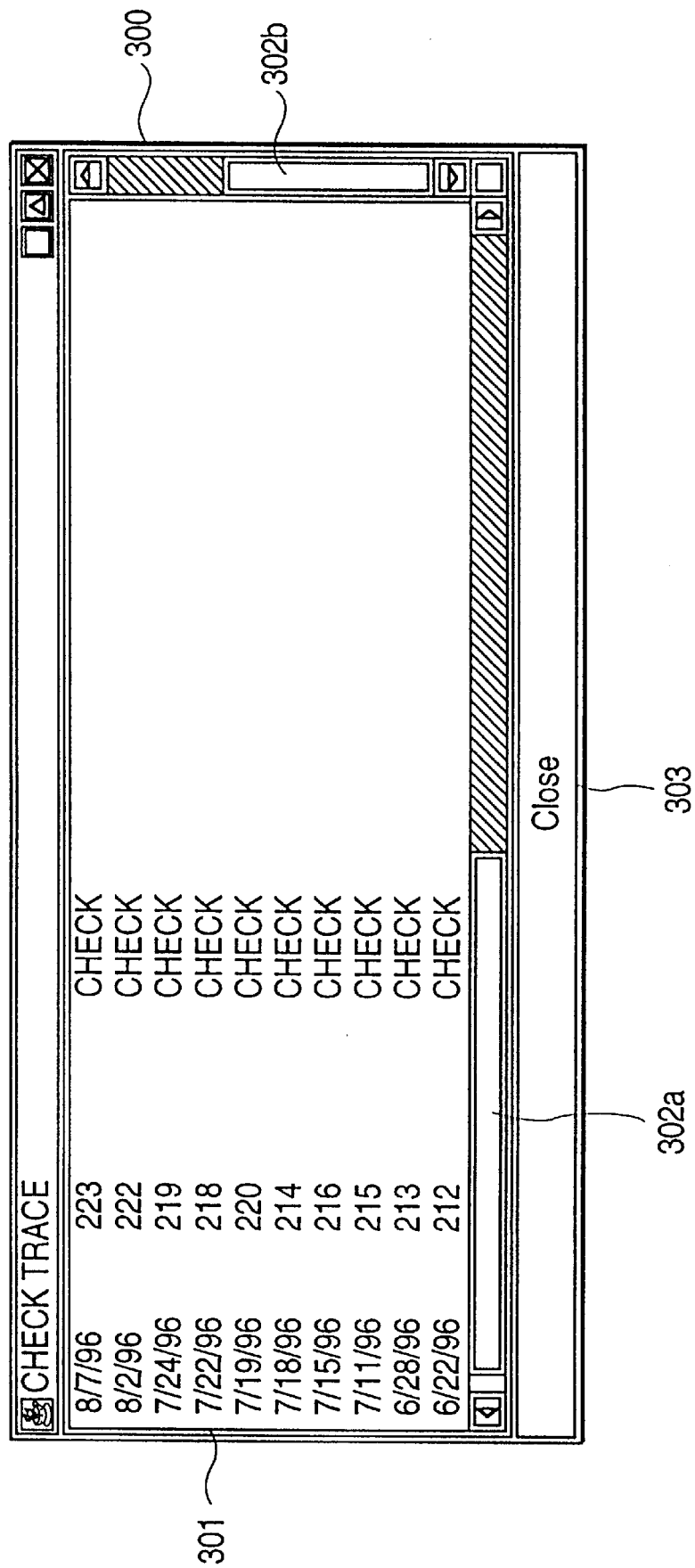
FIG. 23A shows the check trace display window.
Figure 23B:
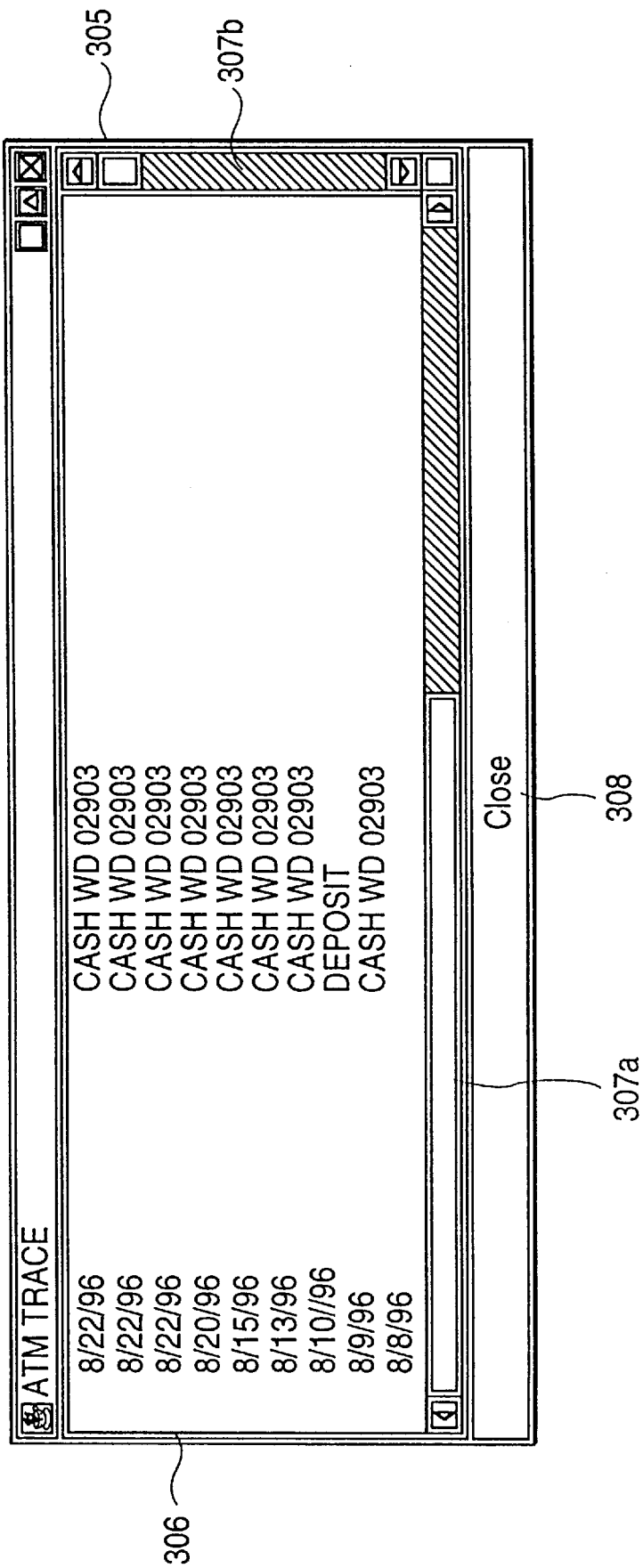
FIG. 23B shows the ATM trace display window.

After the user selects the OK 288 and 299 buttons, either the pop-up window 300, shown in FIG. 23A, or 305, shown in FIG. 23B, respectively, appear. FIG. 23A shows the Check Trace Display. The window 300 includes a list of checks and dates 301 and has scroll bars 302a and 302b for the user to scroll the text. The user may Close 303 the window 300 when finished. FIG. 23B shows the ATM Trace results. The window 305 includes a list of transactions and dates 306 and has scroll bars 307a and 307b for the user to scroll the text. The user may Close 308 the window 305 when finished.

In FIG. 9, if the user selects the button for Financial Planning 135, the system automatically executes a financial planner, such as Quicken. The user can then import information from the system into the planner.

Figure 24:
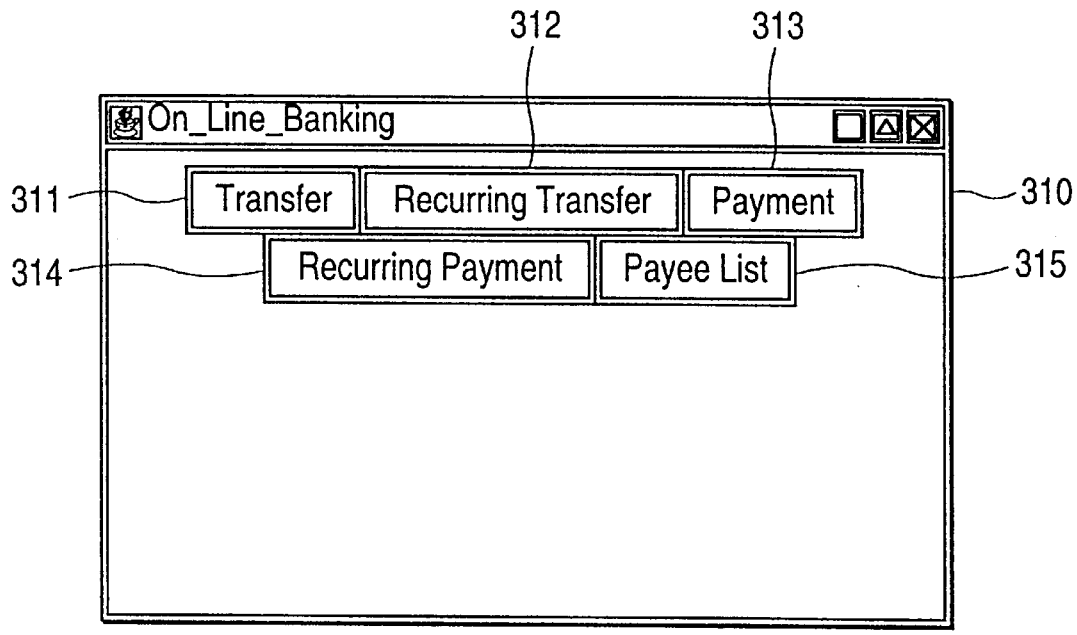
FIG. 24 is the on line banking menu.

In FIG. 9, if the user selects the Make Payment button 133, a window 310 appears, as shown in FIG. 24. This option allows the user to use a bank server to make payments and transfers. This window 310 includes button, for Transfer 311, Recurring Transfer 312, Payment 313, Recurring Payment 314, and Payee List 315.

Figure 25:
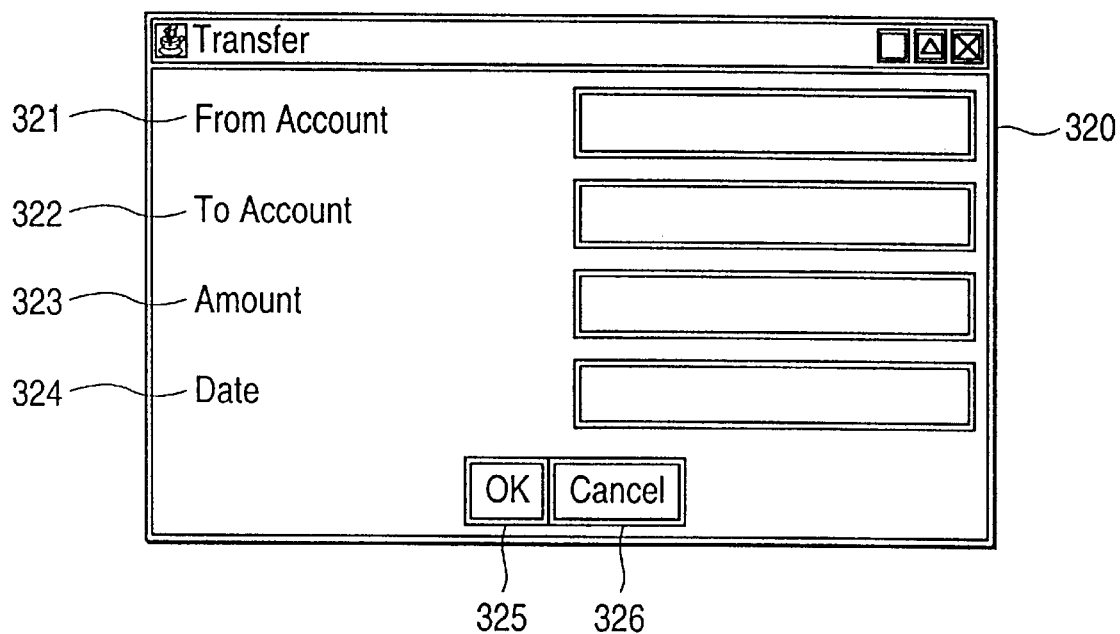
FIG. 25 presents the transfer pop-up window.

In FIG. 24, if the user selects the Transfer button 311, a pop-up window 320 appears, as shown in FIG. 25. This window 320 allows the user to input information about From Account 321, To Account 322, Amount 323, and Date 324 in order to make a one-time transfer. The user may OK 325 the transfer or Cancel 326.

Figure 26:
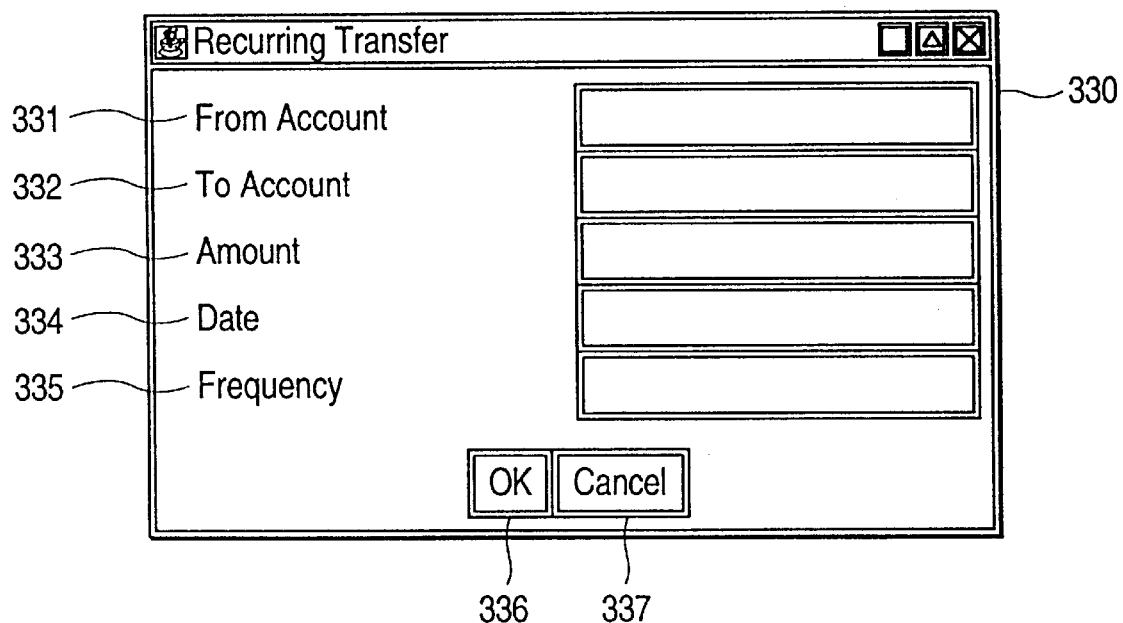
FIG. 26 presents the recurring transfer pop-up window.

In FIG. 24, if the user selects the Recurring Transfer button 312, a pop-up window 330 appears, as shown in FIG. 26. This window 330 allows the user to input information about From Account 331, To Account 332, Amount 333, Date 334, and Frequency 335 in order to make a recurring transfer. The user may OK 336 the recurring transfer or Cancel 337.

Figure 27:
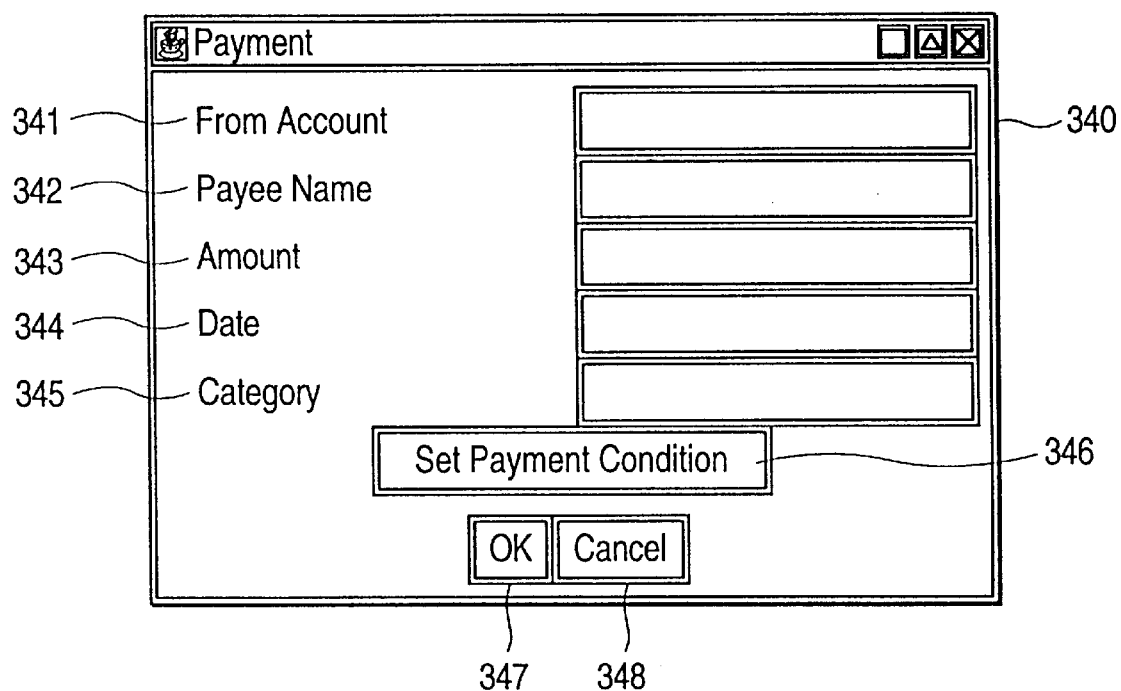
FIG. 27 presents the payment pop-up window.

In FIG. 24, if the user selects the Payment button 313, a pop-up window 340 appears, as shown in FIG. 27. This window 340 allows the- user to input information about From Account 341, Payee Name 342, Amount 343, Date 344, and Category 345 in order to make a one-time payment. In addition, the user can select the button for Set Payment Condition 346. The user may OK 347 the payment or Cancel 348.

Figure 28:
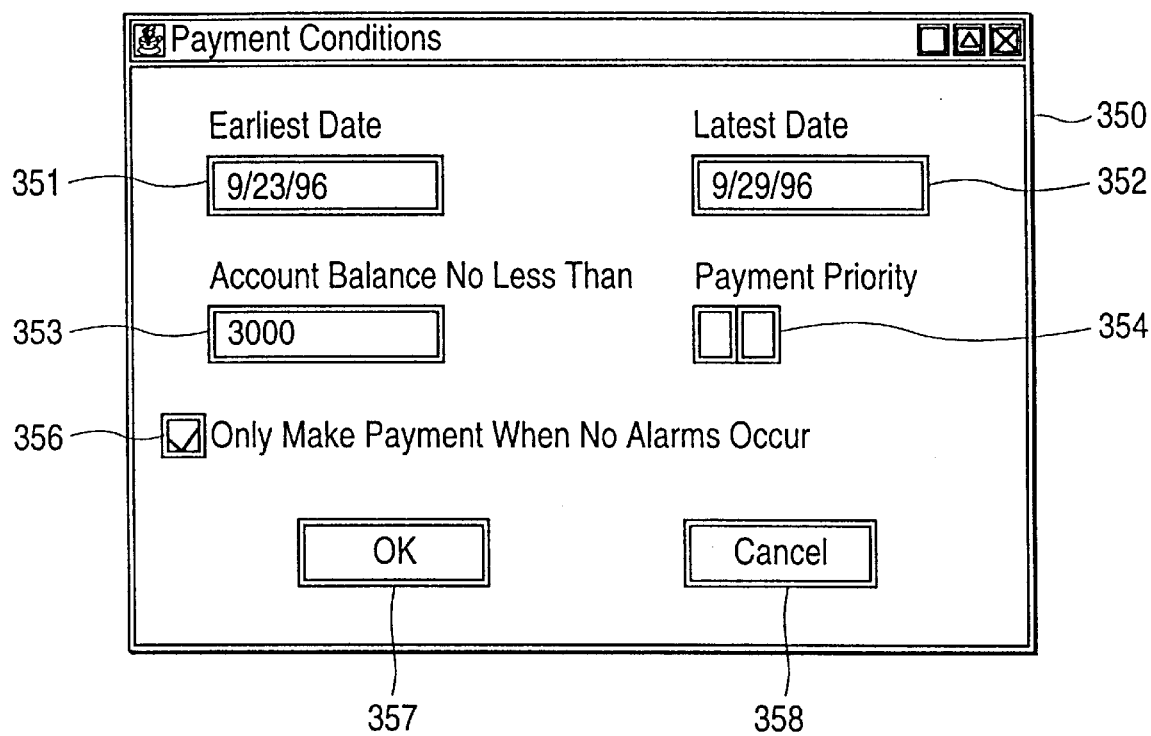
FIG. 28 presents the payment conditions pop-up window.

In FIG. 27, if the user selects the button for Set Payment Condition 346, a window 350 appears, as shown in FIG. 28. Condition information that the user may input includes Earliest Date 351, Latest Date 352, Account balance No Less Than 353, and Payment Priority 354; the user can also select the box for Only Make Payment When No Alarms Occur 356. The user may OK 357 the payment conditions or Cancel 358.

Figure 29:
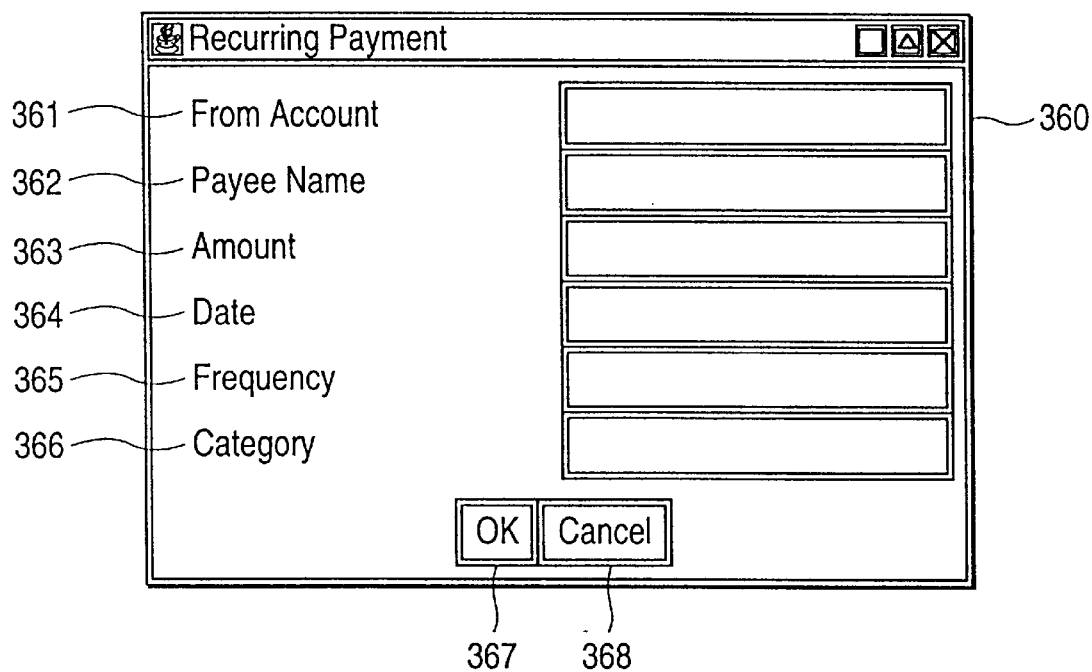
FIG. 29 presents the recurring payment pop-up window.

In FIG. 24, if the user selects the Recurring Payment button 314, a pop-up window 360 appears, as shown in FIG. 29. This window 360 allows the user to input information about From Account 361, Payee Name 362, Amount 363, Date 364, Frequency 365, and Category 366 in order to make a recurring payment. The user may OK 367 the recurring payment or Cancel 368.

In FIG. 24, if the user selects the Payee List 315 button, the window 270, shown in FIG. 21, above for Payee List appears.

In FIG. 9, if the user selects the Expense Category 132 button, the window 260, shown in FIG. 20, above, for Expense Category appears.

Other features of an embodiment of the present invention include the following. The agent can analyze a bill and set condition alarms such as unusual balances in an expense category; when a bill balance is outside normal range; a previously unknown or suspicious payee or expense category; a date or date range by which a bill is to be paid; and insufficient balance to cover expense due. These alarms can be learned by the agent, and set and modified by the user. Also a list of bills can be specified to be processed by the agent in priority order.

An embodiment of the present invention could include other additional features of agents, such as investment advice, tax advice based on learning and adapting to customers transaction history, evaluated net worth, and previously specified goals.

What is claimed is:

1. A method for a user to perform financial transactions and financial accounting, comprising the steps of:

said user initiating a local client application on a terminal;

said local client application initiating communication with a server;

said user accessing a user account on said server;

said user selecting a financial transaction;

said user inputting information relating to said selected financial transaction;

said server performing said financial transaction;

said server automatically downloading information relating to said performed financial transaction to said local client application;

said user initiating transfer of said downloaded information relating to said performed financial transaction from said local client application to a financial software application;

said local client application transferring said downloaded information relating to said performed financial transaction to said financial software application;

automatically performing financial functions using said downloaded information relating to said performed financial transaction to produce output information;

transmitting said output information from said financial software application to said local client application; and uploading said output information from said local software, application to said user account on said server.

2. The method of claim 1 wherein said local software application comprises an intelligent agent.

3. The method of claim 1 wherein said local software application comprises an applet.

4. The method of claim 1 further comprising the steps of:

an intelligent agent analyzing said downloaded and output information to produce an analysis report; and said intelligent agent transmitting said analysis report to said user.

5. The method of claim 4 wherein said step of analyzing said downloaded an output information comprises the steps of:

automatically monitoring said financial transaction;

automatically tracing progress of said financial transaction; and automatically updating files stored by said intelligent agent relating to said financial transaction.

6. The method of claim 1 further comprising the steps of:

said user selecting an action relating to financial transactions; and said user associating said action with a data file.

7. The method of claim 6 wherein said action comprises a warning message.

8. The method of claim 6 wherein said action comprises a reminder message.

9. The method of claim 6 wherein said action comprises a bill payment.

10. The method of claim 9 wherein said bill payment is recurring.

11. The method of claim 6 wherein said action comprises a funds transfer.

12. The method of claim 6 wherein said associating step comprises selecting a date.

13. The method of claim 6 wherein said associating step comprises a beginning date.

14. The method of claim 6 wherein said associating step comprises an end date.

15. The method of claim 6 wherein said associating step comprises a payee account.

16. The method of claim 6 wherein said associating step comprises a transferee account.

17. The method of claim 6 wherein said associating step comprises a condition for a payment.

18. The method of claim 1 further comprising the steps of:

said user selecting an option to import said financial software application; and said local client application importing said financial software application into said local client application.

19. The method of claim 18 further comprising the step of said user initializing data requirements of said local client application for said financial software application.

20. The method of claim 1 wherein said information relating to said selected financial transaction comprises personal information.

21. The method of claim 1 wherein said information relating to said selected financial transaction comprises personal financial information.

22. The method of claim 1 wherein said information relating to said selected financial transaction comprises business information.

23. The method of claim 1 wherein said information relating to said selected financial transaction comprises banking information.

24. The method of claim 1 further including the steps of:

said user entering personal identification information into said local client application;

said local client application transmitting said personal identification information to said server; and said server verifying said personal identification information.

25. The method of claim 1 wherein said terminal comprises a personal computer.

26. The method of claim 1 wherein said terminal comprises a server.

27. The method of claim 1 wherein said terminal comprises a main frame computer.

28. The method of claim 1 wherein said server comprises a personal computer.

29. The method of claim 1 wherein said server comprises a main frame computer.

30. The method of claim 1 wherein said financial transaction comprises paying a bill.

31. The method of claim 1 wherein said financial transaction comprises transferring funds.

32. The method of claim 1 wherein said financial transaction comprises tracing a check.

33. The method of claim 1 wherein said financial transaction comprises tracing automatic teller machine activity.

34. The method of claim 1 further comprising the steps of:

a learning agent monitoring said uploaded output information;

said learning agent identifying trends in said uploaded output information; and said learning agent transmitting said identified trends to said user account.

35. A system for transacting, monitoring, and tracing financial transactions, comprising:

a customer terminal;

a local software application running on the customer terminal for financial transaction performance, monitoring; and tracing;

a server;

a communications device coupling the local software application and the server; and an intelligent agent employed to interact with the server and the local software application;

wherein the local software application initiates communication with the server; wherein a selection of a financial transaction is received from the user; wherein the server performs the financial transaction selected; wherein the server downloads information relating to the performed financial transaction to the local software application; wherein the local software application transfers the downloaded information relating to the performed financial transaction to a financial software application; wherein financial functions using the downloaded information relating to the performed financial transaction is performed to produce output information; wherein the output information is transferred from the financial software application to the local software application; and wherein the output information is uploaded from the local software application to the user account on the server.

36. The system of claim 35, wherein the terminal comprises a personal computer.

37. The system of claim 35, wherein the terminal comprises a local area network.

38. The system of claim 35, wherein the local software application tracks bill payments made by a user through the server.

39. A method for performing financial transactions and financial accounting, comprising:
   a local client application on a terminal receiving a user initiation;
   the local client application initiating communication with a server;
   the server providing the user with access to a user account;
   receiving from the user a selection of a financial transaction;
   receiving information input by the user relating to the selected financial transaction;
   the server performing the financial transaction;
   the server automatically downloading information relating to the performed financial transaction to the local client application;
   receiving an instruction to transfer the downloaded information relating to the performed financial transaction from the local client application to a financial software application;
   the local client application transferring the downloaded information relating to the performed financial transaction to the financial software application;
   automatically performing financial functions using the downloaded information relating to the performed financial transaction to produce output information;
   transmitting the output information from the financial software application to the local client application; and
   uploading the output information from the local software application to the user account on the server.

40. The method of claim 39, wherein the local software application comprises an intelligent agent.

41. The method of claim 39, wherein the local software application comprises an applet.

42. The method of claim 39, further comprising:
   an intelligent agent analyzing the downloaded and output information to produce an analysis report; and
   the intelligent agent transmitting the analysis report to the user.

43. The method of claim 42, wherein analyzing the downloaded and output information comprises:
   automatically monitoring the financial transaction;
   automatically tracing progress of the financial transaction; and
   automatically updating files stored by the intelligent agent relating to the financial transaction.

44. The method of claim 39, further comprising:
   receiving a selection by the user of an action relating to financial transactions; and
   receiving an input from the user that associates the action with a data file.

45. The method of claim 44, wherein the action comprises a warning message.

46. The method of claim 44, wherein the action comprises a reminder message.

47. The method of claim 44, wherein the action comprises a bill payment.

48. The method of claim 47, wherein the bill payment is recurring.

49. The method of claim 44, wherein the action comprises a funds transfer.

50. The method of claim 44, wherein receiving an input from the user that associates the action with a data file comprises receiving a selection of a date.

51. The method of claim 44, wherein receiving an input from the user that associates the action with a data file comprises receiving a beginning date.

52. The method of claim 44, wherein receiving an input from the user that associates the action with a data file comprises receiving an end date.

53. The method of claim 44, wherein receiving, an input from the user that associates the action with a data file comprises receiving a payee account.

54. The method of claim 44, wherein receiving an input from the user that associates the action with a data file comprises receiving a transferee account.

55. The method of claim 44, wherein receiving an input from the user that associates the action with a data file comprises receiving a condition for a payment.

56. The method of claim 39, further comprising:
   receiving a selection from the user of an option to import the financial software application; and
   the local client application importing the financial software application into the local client application.

57. The method of claim 56, further comprising receiving from the user initializing data requirements of the local client application for the financial software application.

58. The method of claim 39, wherein the information relating to the selected financial transaction comprises personal information.

59. The method of claim 39, wherein the information relating to the selected financial transaction comprises personal financial information.

60. The method of claim 39, wherein the information relating to the selected financial transaction comprises business information.

61. The method of claim 39, wherein the information relating to the selected financial transaction comprises banking information.

62. The method of claim 39, further comprising:
   receiving at the local client application personal identification information from the user;
   the local client application transmitting the personal identification information to the server; and
   the server verifying the personal identification information.

63. The method of claim 39, wherein the terminal comprises a personal computer.

64. The method of claim 39, wherein the terminal comprises a server.

65. The method of claim 39, wherein the terminal comprises a main frame computer.

66. The method of claim 39, wherein the server comprises a personal computer.

67. The method of claim 39, wherein the server comprises a main frame computer.

68. The method of claim 39, wherein the financial transaction comprises a bill payment.

69. The method of claim 39, wherein the financial transaction comprises a funds transfer.

70. The method of claim 39, wherein the financial transaction comprises a trace of a check.

71. The method of claim 39, wherein the financial transaction comprises a trace of automatic teller machine activity.

72. The method of claim 39, further comprising:
- a learning agent monitoring the uploaded output information;
- the learning agent identifying trends in the uploaded output information; and
- the learning agent transmitting the identified trends to the user account.

73. A system for performing financial transactions and financial accounting, comprising:
- means for receiving a user initiation by a local client application on a terminal;
- means for the local client application to initiate communication with a server;
- means for the server to provide the user with access to a user account;
- means for receiving from the user a selection of a financial transaction;
- means for receiving information input by the user relating to the selected financial transaction;
- means for the server to perform the financial transaction;
- means for the server to download automatically information relating to the performed financial transaction to the local client application;
- means for receiving an instruction to transfer the downloaded information relating to the performed financial transaction from the local client application to a financial software application;
- means for the local client application to transfer the downloaded information relating to the performed financial transaction to the financial software application;
- means for automatically performing financial functions using the downloaded information relating to the performed financial transaction to produce output information;
- means for transmitting the output information from the financial software application to the local client application; and
- means for uploading the output information from the local software application to the user account on the server.

* * * * *